(12) United States Patent
Sedlmayr

(10) Patent No.: US 10,422,018 B2
(45) Date of Patent: Sep. 24, 2019

(54) METHOD AND DEVICE FOR REMELTING AND/OR REMELT-ALLOYING METALLIC MATERIALS, IN PARTICULAR NITINOL

(71) Applicant: G. RAU GmbH & Co. KG, Pforzheim (DE)

(72) Inventor: Gerhard Sedlmayr, Engelsbrand (DE)

(73) Assignee: G. Rau GmbH & Co. KG, Pforzheim (DE)

( * ) Notice: Subject to any disclaimer, the term of this patent is extended or adjusted under 35 U.S.C. 154(b) by 912 days.

(21) Appl. No.: 14/891,600

(22) PCT Filed: May 1, 2014

(86) PCT No.: PCT/EP2014/058938
§ 371 (c)(1),
(2) Date: Feb. 16, 2016

(87) PCT Pub. No.: WO2014/184007
PCT Pub. Date: Nov. 20, 2014

(65) Prior Publication Data
US 2016/0151178 A1   Jun. 2, 2016

(30) Foreign Application Priority Data
May 17, 2013   (DE) .......................... 10 2013 008 396

(51) Int. Cl.
*C22B 9/22* (2006.01)
*B23K 37/00* (2006.01)
(Continued)

(52) U.S. Cl.
CPC .......... *C22B 9/226* (2013.01); *B23K 15/0046* (2013.01); *B23K 15/0086* (2013.01);
(Continued)

(58) Field of Classification Search
CPC ......... C22B 9/223; C22B 9/226; C22B 9/228; C22F 3/00; C22F 3/02; C22F 1/006;
(Continued)

(56) References Cited

U.S. PATENT DOCUMENTS 3,838,288 A   9/1974 Stolz et al.
3,953,253 A   4/1976 Clark
(Continued)

FOREIGN PATENT DOCUMENTS

DE   1 121 281 B   1/1962
DE   2 209 148 A1   9/1973
(Continued)

OTHER PUBLICATIONS

Nishida et al., "Precipitation Processes in Near-Equiatomic TiNi Shape Memory Alloys," Metallurgical Trans. A, vol. 17A, pp. 1505-1515 (Sep. 1986).
(Continued)

*Primary Examiner* — Tima M. McGuthry-Banks
(74) *Attorney, Agent, or Firm* — Muncy, Geissler, Olds & Lowe, P.C.

(57) ABSTRACT

A method and an apparatus for producing metallic semi-finished products by means of remelting and/or remelt-alloying. Here, the material is melted selectively locally in a melting capillary in the material volume by means of high-energy, focused radiation, the melting capillary is moved through the material and the material is cooled down at a high cooling rate by means of a cooled heat sink, which is located close to the melting capillary and coupled to the material in a well heat-conductive manner.

17 Claims, 8 Drawing Sheets

(51) Int. Cl.
C21D 1/09 (2006.01)
B23K 26/70 (2014.01)
B23K 15/00 (2006.01)
C22F 3/00 (2006.01)
C22F 3/02 (2006.01)
C22F 1/00 (2006.01)
C21D 1/04 (2006.01)

(52) U.S. Cl.
CPC .......... *B23K 26/703* (2015.10); *B23K 37/003* (2013.01); *C21D 1/04* (2013.01); *C21D 1/09* (2013.01); *C22B 9/223* (2013.01); *C22B 9/228* (2013.01); *C22F 1/006* (2013.01); *C22F 3/00* (2013.01); *C22F 3/02* (2013.01); *C21D 2201/01* (2013.01)

(58) Field of Classification Search
CPC ............... B23K 26/703; B23K 37/003; B23K 15/0046; B23K 15/0086; C21D 1/04; C21D 1/09; C21D 2201/01
See application file for complete search history.

(56) References Cited

U.S. PATENT DOCUMENTS

| | | | |
|---|---|---|---|
| 4,121,647 A | 10/1978 | Paton et al. | |
| 4,142,571 A | 3/1979 | Narasimhan | |
| 4,400,208 A | 8/1983 | Ackermann | |
| 4,452,647 A | 6/1984 | Sailas | |
| 4,537,239 A | 8/1985 | Budzyn et al. | |
| 5,365,664 A | 11/1994 | Whitney, Jr. | |
| 5,564,490 A | 10/1996 | Liebermann et al. | |
| 5,792,289 A | 8/1998 | Morton et al. | |
| 5,829,516 A * | 11/1998 | Lavochkin | F28F 1/22 165/80.4 |
| 5,842,511 A | 12/1998 | Raybould et al. | |
| 6,375,458 B1 | 4/2002 | Moorleghem et al. | |
| 6,398,881 B1 | 6/2002 | Brenner et al. | |
| 6,422,010 B1 | 7/2002 | Julien | |
| 6,612,204 B1 | 9/2003 | Droese et al. | |
| 6,631,753 B1 | 10/2003 | Carter, Jr. et al. | |
| 6,669,794 B1 * | 12/2003 | Bellouard | C22F 1/006 148/563 |
| 7,599,048 B2 | 10/2009 | Yoo et al. | |
| 8,430,981 B1 | 4/2013 | Sczerzenie et al. | |
| 9,186,853 B2 * | 11/2015 | Khan | B23K 26/0006 |
| 2001/0054460 A1 | 12/2001 | Stika et al. | |
| 2003/0056863 A1 | 3/2003 | Yoshimi et al. | |
| 2003/0156965 A1 | 8/2003 | Ernst et al. | |
| 2004/0043246 A1 | 3/2004 | Myojin et al. | |
| 2004/0059410 A1 | 3/2004 | Cox | |
| 2005/0022627 A1 | 2/2005 | Chen | |
| 2005/0082773 A1 | 4/2005 | Julien | |
| 2005/0096733 A1 | 5/2005 | Kovneristy et al. | |
| 2005/0257864 A1 | 11/2005 | Marquardt et al. | |
| 2005/0263219 A1 | 12/2005 | Hoeschele et al. | |
| 2007/0251664 A1 | 11/2007 | Hanna et al. | |
| 2007/0251665 A1 | 11/2007 | Byrne et al. | |
| 2007/0256454 A1 | 11/2007 | Rosenflanz et al. | |
| 2008/0000881 A1 | 1/2008 | Storm et al. | |
| 2008/0093045 A1 | 4/2008 | Rimmer et al. | |
| 2008/0125848 A1 | 5/2008 | Kusleika et al. | |
| 2009/0139612 A1 | 6/2009 | Lu et al. | |
| 2009/0260723 A1 | 10/2009 | Pandey | |
| 2009/0310898 A1 | 12/2009 | Trojahn et al. | |
| 2010/0136364 A1 | 6/2010 | Jahn et al. | |
| 2010/0154940 A1 | 6/2010 | Luft et al. | |
| 2010/0274077 A1 | 10/2010 | Rokicki | |
| 2011/0073636 A1 | 3/2011 | Arjakine et al. | |
| 2011/0089150 A1 | 4/2011 | Arjakine et al. | |
| 2012/0000577 A1 | 1/2012 | Nazmy et al. | |
| 2012/0039740 A1 | 2/2012 | Wojcik | |
| 2012/0097653 A1 | 4/2012 | Yabe et al. | |
| 2012/0267347 A1 | 10/2012 | Arjakine et al. | |
| 2012/0281510 A1 | 11/2012 | Gyger et al. | |
| 2013/0014860 A1 | 1/2013 | Li et al. | |
| 2013/0071283 A1 | 3/2013 | Kano et al. | |
| 2013/0071284 A1 | 3/2013 | Kano et al. | |
| 2017/0246680 A1 | 8/2017 | Oda et al. | |

FOREIGN PATENT DOCUMENTS

| | | | | |
|---|---|---|---|---|
| DE | 252 134 A1 | 12/1987 | | |
| DE | 38 27 266 A1 | 4/1990 | | |
| DE | 39 21 129 C1 | 2/1991 | | |
| DE | 38 27 266 C2 | 7/1991 | | |
| DE | 102 31 777 A1 | 2/2004 | | |
| DE | 10 2013 008 396 B4 | 4/2015 | | |
| EP | 0 024 506 A1 | 3/1981 | | |
| EP | 0 073 241 B1 | 8/1993 | | |
| EP | 2460543 A1 * | 6/2012 | ............ | A61L 29/02 |
| FR | 2 599 640 A1 | 12/1987 | | |
| JP | S 59-104459 A | 6/1984 | | |
| JP | S 59-150069 A | 8/1984 | | |
| JP | S 60-103166 A | 6/1985 | | |
| JP | S 60-169551 A | 9/1985 | | |
| JP | S 61-41752 A | 2/1986 | | |
| JP | S 61-106740 A | 5/1986 | | |
| JP | S62176666 A | 8/1987 | | |
| JP | H 05-118272 A | 5/1993 | | |
| JP | H 08-337854 A | 12/1996 | | |
| JP | H09291347 A | 11/1997 | | |
| JP | 2009535293 A | 11/2007 | | |
| JP | 2008199019 A | 8/2008 | | |
| JP | 2009078948 A | 4/2009 | | |
| JP | 2012228722 A | 11/2012 | | |
| JP | 2013500864 A | 1/2013 | | |
| WO | WO 00/47351 A1 | 8/2000 | | |
| WO | WO 2010/129862 A1 | 11/2010 | | |
| WO | WO 2013/119912 A1 | 8/2013 | | |
| WO | WO 2013/139383 A1 | 9/2013 | | |

OTHER PUBLICATIONS

Yong Liu, "Mechanical and thermomechanical properties of $Ti_{50}Ni_{25}Cu_{25}$ melt spun ribbon," Mater. Sci & Eng., vol. A354, pp. 286-291 (2003).

Yong Liu, Erratum to , "Mechanical and thermomechanical properties of $Ti_{50}Ni_{25}Cu_{25}$ melt spun ribbon," Mater. Sci & Eng, vol. A369, pp. 314-316 (2004).

H. J. Klein et al., "Effective Elecroslag Remelting of Superalloys", Stellite Division, Cabot Corporation, Defense Technical Information Center, 1972, pp. 1-26.

Krishna et al., "Laser Processing of Net-Shape NTI Shape Memory Alloy," Metallurgical & Material Trans. A, vol. 38A, pp. 1096-1103 (May 2007).

C.M. Wayman, "Shape Memory Alloys," MRS Bulletin, vol. 18, pp. 49-56 (Apr. 1993).

Hosoda et al., "Martensite transformation temperatures and mechanical properties of ternary NiTi alloys with offstoichiometriccompositions," Intermetallics 6, pp. 291-301 (1998).

Shuhua et al., "Structure and properties of CuCr50 prepared by laser fast remelt," Laser Technology, vol. 24, No. 6, pp. 388-391 (Dec. 2000).

Elahinia et al., "Manufacturing and processing of NiTi implants: A review," Progress in Mater. Sci., vol. 57, pp. 911-946 (2012).

Rahim et al., "Impurity levels and fatigue lives of pseudoelastic NiTi shape memory alloys," Acta Materialia, vol. 61, pp. 3667-3686 (2013).

Sun et al., "Effect of laser surface remelting on the corrosion behavior of commercially pure titanium sheet," Materials Sci. & Eng., vol. A345, pp. 293-300 (2003).

Wohlschlögel et al., "Potentiodyamic polarization study on electropolished nitinol vascular implants," J. of the Biomedical Materials Research Part B: Applied Biomaterials, vol. 1008, pp. 2231-2238 (2012).

Duwez et al., "Continuous Series of Metastable Solid Solutions in Silver-Copper Alloys," J. of Appl Phys., vol. 31, p. 1136 (1960).

(56) References Cited

OTHER PUBLICATIONS

Sawaguchi et al., "Crack Initiation and Propagation in 50.9 At. Pct Ni—Ti Pseudoelastic Shape-Memory Wires in Bending-Rotation Fatigue," Metallurgical & Material Trans. A, vol. 34, pp. 2847-2860 (2003).

Grad et al., "Analysis of Crack Initiation at Non-Metallic Inclusions in High-Strength Steels," Practical Metallography, vol. 49, pp. 468-469 (2012).

ASTM Standard F 2063-05, "Standard Specification for Wrought Nickel-Titanium Shape Memory Alloys for Medical Devices and Surgical Implants," pp. 1-4 (Nov. 2005).

Luetjering et al., Engineering Materials and Process: Titanium, $2^{nd}$ Ed., Springer, pp. 1-448 (2003 & 2007).

Lutzmann, "Beitrag zur Prozessbeherrschung des Elektronienstrahlschmelzens," Dissertation for Technischen Universitaet Muenchen, Utz Pub., pp. 1-221 (2010).

Frenzel, "Werkstoffkundliche Untersuchungen zur schmelzmetallurgischen Herstellung von Ni-reichen NiTi-Formgedaechtnislegierungen," Dissertation for Ruhr-Universitaet Bochum, Shaker Pub., pp. 1-144 (2005).

Boyer et al.., Materials Properties Handbook: Titanium Alloys, ASM International, pp. 1-1176 (1994).

\* cited by examiner (a)

(b)

(c)

(d)

METHOD AND DEVICE FOR REMELTING AND/OR REMELT-ALLOYING METALLIC MATERIALS, IN PARTICULAR NITINOL

This nonprovisional application is a National Stage of International Application No. PCT/EP2014/058938, which was filed on May 1, 2014, and which claims priority to German Patent Application No. 10 2013 008 396.6, which was filed in Germany on May 17, 2013, and which are both herein incorporated by reference.

BACKGROUND OF THE INVENTION

Field of the Invention

The invention relates to a method and an apparatus for producing semi-finished metallic products by remelting and/or remelt-alloying metallic materials, wherein solidification of the melt, i.e. re-solidification/quenching of the molten material at a high cooling rate (so-called quenching) is effected by means of a cooling device. Here, the processed materials are preferably disk, strip-, rod-, round rod-, wire-, bolt- or pipe-shaped initial semi-finished materials. The invention particularly relates to the production or processing of materials or semi-finished materials made of Nitinol (NiTi). In the following, the invention will therefore primarily be explained based on Nitinol, in which the invention preferably, but not exclusively can be applied.

Description of the Background Art

DE 1121281 A discloses a melting system for electric arc melting and electron melting of metals with reduced pressure, in which the metal is degassed. The molten metal drips into a cooled crucible and forms therein a molten pool which is kept liquid.

It is known that different phases can occur during solidification of a metal depending on the elements used and their ratio, see e.g. Gerhard Welsch, Rodney Boyer, E. W. Collings, "Materials Properties Handbook: Titanium Alloys," ASM International 1993 and Gerd Lutjering, James C. Williams, "Titanium," Springer 2003/2007 and Jan Frenzel, "Werkstoffkundliche Untersuchungen zur schmelzmetallurgischen Herstellung von Ni-reichen NiTi-Formgedächtnislegierungen," Dissertation Ruhr University Bochum 2005, Shaker Verlag 2006. Furthermore, the presence of impurities such as oxygen and carbon may produce inclusions in the alloy formed during the melting process (see the literature cited). In metallurgy, inclusions are generally referred to as non-metallic materials in metals due to production or manufacturing.

The phases and inclusions often have an impact on the material properties such as strength, formability and fatigue behavior. Therefore, the controlled formation of phases and inclusions during the melting process can be used to achieve predictable and desired material properties. With respect to the influence of inclusions on the fatigue behavior of steels in general, see e.g. P. Grad, B. Reuscher, A. Brodyanski, M. Kopnarski and E. Kerscher, "Analysis of the Crack Initiation at Non-Metallic Inclusions in High-Strength Steels," Practical Metallography 49 (2012) 468-469.

It is known to quickly quench metals or metal alloy systems from the melt by means of different methods in order to provide the material, when in the solid state, with properties that it does not have after slow casting and solidification processes, see for example the following references: Pol Duwez cited in U.S. Pat. No. 4,400,208 A; Pol Duwez, R. H. Willems and W. Klement Jr., "Continuous Series of Metastable Solid Solutions," Journal of Applied Physics 31 (1960) 1136; US 2003/056863 A1 US 2009/139612 A1 US 2009/260723 A1 EP 0 024 506 A1 U.S. Pat. Nos. 4,537,239; 5,564,490; 5,842,511; 5,365,664; US 2004/0043246 A1. Thus, it is possible to transform metal alloys by rapid solidification into the amorphous state or to keep elements in solid solution (alloy supersaturation), which would already segregate upon slow solidification. Furthermore, a rapid cooling can cause alloys to solidify in a microcrystalline manner and prevent them from being precipitated as a course phase.

By rapid cooling from the melt, the formation of such equilibrium phases can be suppressed to a large extent. However, due to the limited thermal conductivity of many materials, there are geometry- or volume-related limited cooling rates such that the formation of extraneous phases can usually not to be suppressed to the desired extent.

A rapid solidification is achieved by transferring the heat content of a melt to a cooling medium being in contact with the melt by means of thermal conduction in a time as short as possible. Here, the quenching rate depends to a decisive extent on the size of the contact surface of the melt to the cooling medium in the ratio of the amount of the melt and the material of the cooling medium. The larger the contact surface in relation to the amount of melt, the higher is the quenching rate.

It is known from the prior art that quenching of molten metals can be done by means of melt spinning. See, for example, US 2013/0014860 A1, US 2012/0281510 A1, US 2007/0251665 A1 and WO 2000/47351 A1. Here, a thin stream of alloy melt is sprayed onto a rotating copper wheel serving as a cooling device. This produces thin, narrow strips. According to another known method, atomizing of a metal melt is performed into a cooling medium so that said melt is present as a fine powder.

The known methods have in common that they need to be followed by a further consolidation, i.e. mating of materials, for producing a compact material. It is possible to build up a body having a greater volume, for example by means of spray compacting. It is likewise possible to build massive bodies by selective powder melting (rapid prototyping). However, the known processes are usually subject to absorption of gas or undesirable remaining porosity.

In the case of Nitinol (NiTi), it is known to perform a heat treatment in order to shape the material or to influence the transition temperature or the elastic properties by a subsequent quenching process, i.e. to perform a rapid cooling. Therein quenching is not carried out from the melt, but with a solid body, i.e. this refers to solid phase processes and not to liquid phase processes. Examples thereof are WO 2013/119912 A1, US 2005/0082773 A1, US 2005/0096733 A1, US 2004/0059410 A1, U.S. Pat. No. 6,422,010 B1, U.S. Pat. No. 6,375,458 B1, JP 61106740 A, JP 61041752 A, JP 60169551 A, JP 60103166 A, JP 59150069 A and U.S. Pat. No. 3,953,253.

It is also known in Nitinol to produce very thin filaments or very thin strip material from a completely melted base material present in a crucible by means of rapid cooling. To that end, the liquid metal melt is applied to a cooled copper wheel or guided between two cooled rolls. In this case, a rapid cooling occurs, which is referred to as quenching, and the material solidifies. Methods of such type are described in JP 8337854 A, JP 5118272 A and JP 59104459 A, for example.

In Nitinol (NiTi), it has not yet been known to influence the metallurgical and mechanical properties of the material in form of a massive semi-finished product in a targeted manner, in particular the formation and size, the proportion and the distribution of extraneous phases in the massive semi-finished product by rapid cooling of the melt. Further, it has not yet been known to cool semi-finished Nitinol products out of the melt in a rapid active manner in the production.

According to the prior art, Nitinol is produced by various vacuum melting methods, namely VIM (vacuum induction melting) and VAR (vacuum arc remelting). In conventional EBR (electron beam remelting), for example known from the production of high-melting refractory metals such as tantalum and niobium, the melt solidifies in water-cooled copper crucibles, where the relatively large melt volume prevents a rapid solidification.

From the reference Mohammad H. Elahinia, Mahdi Hashemi, Majid Tabesh, Sarit B. Bhaduri, "Manufacturing and processing of NiTi Implants: A Review," Progress in Materials Science 57 (2012) 911-946, it is known to use EBM (electron beam melting) for the production of Nitinol. In this case, a rod-shaped body of the base metals Ni and Ti is melted by an electron beam of high power with a large melting-off volume, wherein the body is at once melted over its entire cross-section. The molten material drips into a cooled copper mold and solidifies there due to its volume at a relatively slow cooling rate in order that the melt added does not encounter a fixed but a liquid material and can therefore form a homogeneous body. EBR with focused radiation has not yet been used for the manufacture of Nitinol.

When producing Nitinol, a multitude of undesirable extraneous phases and secondary phases in the form of binary, ternary and quaternary phases having different sizes and distribution forms in the solidification process in addition to the desired intermetallic primary phase, NiTi. They include, e.g. carbides such as TiC and the intermetallic phases $Ti_2Ni$, $Ti_2NiO_x$, $Ti_4Ni_2O$ and $Ti_4Ni_3$. These are commonly referred to as inclusions, because it is assumed that they have a very large influence on the material properties. Because of their constitution, the formation of these phases is almost inevitable and in particular favored by oxygen and carbon impurities which are introduced via the source materials (Ti and Ni) or originate from the process environment (crucible material or possibly surrounding atmosphere). In particular, oxygen and carbon impurities cause the phases $Ti_2NiO_x$ and TiC. These are referred to as inclusions in the Standard ASTM F2063-5.

Recent studies confirm the assumption that the number, size and shape of such phases/inclusions in semi-finished products, e.g. pipes or wires, strongly influence the properties (e.g. corrosion resistance and fatigue behavior of Nitinol stents) of products made thereof; see, for example US 2010/0274077 A1. During subsequent shaping processes, around the inclusions that are more hard to deform often cavities (voids) form, which voids constitute additional weak points for corrosion, see, e.g. US 2012/0039740 A1.

Nitinol is an implant material. It is known that non-homogeneous structures and inclusions may reduce its corrosion resistance and durability; see, for example, the citations in U.S. Pat. No. 8,430,981 B1 by C. M. Wayman, "Smart Materials—Shape Memory Alloys," MRS Bulletin 18 (1993) 49-56 and M. Nishida, C. M. Wayman, T. Honma, "Precipitation processes in nearequiatomic TiNi shape memory alloys," Metallurgical Transactions A 17 (1986) 1505-1515 and H. Hosoda, S. Hanada, K. Inoue, T. Fukui, Y. Mishima, T. Suzuki, "Martensite transformation temperatures and mechanical properties of ternary NiTi alloys with offstoichiometric compositions," Intermetallics 6 (1998) 291-301.

The influence of inclusions on the fatigue behavior of NiTi is described, for example, in Tak Ahiro Sawaguchi, Gregor Kausträter, Alejandro Yawny, Martin Wagner, Gunther Eggeler, "Crack initiation and propagation in 50.9 at. pct Ni—Ti pseudoelastic shape-memory wires in bending-rotation fatigue," Metallurgical and Materials Transactions A 34 (2003) 2847-2860 and in M. Rahima, J. Frenzel, M. Frotscher, J. Pfetzing-Micklich, R. Steegmüller, M. Wohlschlögel, H. Mughrabi, G. Eggeler, "Impurity levels and fatigue lives of pseudoelastic NiTi shape memory alloys," Acta Materialia 61 (2013) 3667-3686. Regarding the influence of inclusions on the corrosion resistance, see the reference Markus Wohlschlögel, Rainer Steegmüller and Andreas Schüßler, "Potentiodynamic polarization study on electropolished Nitinol vascular implants," Journal of Biomedical Materials Research Part B: Applied Biomaterials 100B (2012) 2231-2238.

Especially with filigree implant structures (stents, heart valve frames) exposed to an additional corrosion fatigue by the body fluids, inclusions due to solidification have a negative effect on the fatigue and corrosion behavior. Therefore, the manufacturers of semi-finished Nitinol products make great efforts to produce Nitinol alloys with inclusions as low as possible, for example, by using high-purity raw materials, such as the so-called "iodide-reduced titanium crystal bar," resulting in very high production costs.

By optimizing processes, the volume proportion of the inclusions could be significantly reduced in recent years, though interfering inclusions still occur, which can repeatedly be identified as fracture-triggering, especially in the fatigue behavior. The Nitinol produced by means of vacuum melting technology according to the prior art currently still contains undesired inclusions whose formation cannot be completely avoided, even when using very expensive, highly pure initial raw materials. Among experts there are still discussions regarding the effect of inclusions in Nitinol. Almost all technical alloys contain inclusions, and experts assume that Nitinol can not be melted without forming inclusions being omnipresent. It is believed that their size, distribution and nature can be influenced to a certain degree and that smaller, rounder and fewer inclusions may result in a improved fatigue behavior, but so far it could not be achieved in the prior art to produce Nitinol with no, almost no or very few, very small inclusions.

According to common standards, the volume proportion of inclusions and voids in medically used Nitinol may be 2.8% maximum and they may not be larger than 39 μm. Nowadays, technical further developments enable inclusion sizes between 10 μm and 20 μm. However, in particular the increasing miniaturization of medical implants (neurostents) and the increasing quality requirements (heart valve frames) require further efforts to improve the level achieved.

SUMMARY OF THE INVENTION

It is therefore an object of the present invention to provide an improved method and apparatus by which a material can be remelted and/or can be realloyed such that the semi-finished product formed has a structure which has characteristics of rapid solidification over a substantial portion of its cross-section. In particular, the object underlying the present invention is to provide—in a preferred embodiment—a method and a corresponding apparatus that enable producing semi-finished products from Nitinol, which products do no longer have interfering inclusions, i.e. have no, virtually no or very few, very small inclusions.

A method according to the invention for producing metallic semi-finished products by remelting and/or remelt-alloying metallic materials, wherein solidification of the melt is effected by means of a cooling device at a high cooling rate is characterized in that the material is melted selectively locally in a melting capillary in the material volume by means of high-energy, focused radiation, in that the heat dissipation from the melting capillary is effected via the cold, non-remelted material volume adjacent to the melting capillary, in that simultaneously with the melting of the material by means of the focused radiation the material volume is cooled down by means of a heat sink in order to dissipate the heat transferred from the melting capillary to the material volume, wherein the heat sink is coupled to at least one part of at least one surface of the material volume in a well heat-conductive manner and the heat sink is cooled by means of a cooling liquid, in that the heat sink is coupled to the material volume in a well heat-conductive manner at a point of the material volume, which is located close to the focus of the focused radiation on the material or close to the melting capillary in that for melting the material volume of the material surrounding the melting capillary, the focus of the focused radiation is moved over the material or the melting capillary is moved through the material, respectively, wherein the focus of the high-energy, focused radiation and the radiated material are moved relative to one another such that the desired surface is swept over by the focus.

Thus, the invention includes in a selective remelting method by means of high-energy, focused radiation which forms a melting capillary in a material, i.e. a melt channel with a small diameter, wherein the formation of inclusions in the supercooled liquid is prevented by rapid local heating and rapid cooling of the melt. The method according to the invention serves for remelting and/or (re)-alloying of preferably plate-, strip-, rod-, tube rod, wire- or tube-shaped materials as initial semi-finished material, wherein the melting is effected by means of a high-energy, focused radiation in a small local area in form of a melting capillary which is continuously passed through the material volume, and a rapid solidification/quenching of the molten material is enforced by means of a cooled heat sink by means of intense cooling of the material close to the melting capillary.

The high cooling rate required for a solidification free of precipitations is primarily achieved by the selectivity of the melt volume, i.e. by a small local melt volume in a melting capillary. The inventive idea is to reduce the melting volume by use of high-energy, focused radiation such that the rapid removal of heat by the material directly adjoining the melting capillary leads to a strongly under-cooled melt. In order to achieve a high cooling rate, in a continuous method according to the invention performed at stable conditions, the heat introduced into the material for melting is dissipated. To that end serves a close, effective cooling of the material in the region of the melting capillary having a heat sink cooled by a cooling liquid.

A corresponding apparatus according to the invention for producing metallic semi-finished products by means of remelting and/or remelt-alloying metallic materials, wherein solidification of the melt is effected by means of a cooling device at a high cooling rate, is characterized in that it comprises a radiation device for generating high-energy, focused radiation configured to selectively locally melt the material in a melting capillary in the material volume, wherein the dissipation of heat from the melting capillary is effected via the non-remelted, cold material volume adjacent to the melting capillary, it comprises a cooling device for cooling at least one heat sink, which is configured for dissipating the heat transferred from the melting capillary to the material volume by cooling the material volume down by means of the heat sink, while at the same time the material is melted by means of the focused radiation, wherein the heat sink is adapted to be coupled in a well heat-conductive manner to at least one part of at least one surface of the material volume and the heat sink is adapted to be cooled by means of a cooling liquid, the heat sink is adapted to be coupled in a well heat-conductive manner at one point of the material volume to the material volume, which point is located close to the focus of the focused radiation on the material or to the melting capillary in the material, respectively, and is configured such that for melting the material volume of the material surrounding the melting capillary the focus of the focused radiation on the material is moveable over the material or the melting capillary is moveable through the material, wherein the focus of the high-energy, focused radiation and the radiated material are movable relative to one another such that the desired area is swept over by the focus.

In the context of the present invention it has been found that the secondary phases present in Nitinol are more or less coarsened depending on the solidification rate. In the present invention it has also been found that the high proportion of inclusions in Nitinol produced according to the prior art is to be traced back to the low cooling rate in the common casting production and that with a fast, active cooling, the formation of inclusions in the supercooled melt is prevented. The dissolution of the inclusions is thus carried out by remelting, combined with a high cooling rate preventing formation of the precipitations.

Basically, the cooling rate in a production according to the prior art could be increased in that the amount of heat introduced into the material for melting is reduced. To dissolve the undesired phases, however, the melting temperature is to be exceeded, i.e. a large amount of heat is to be introduced. The invention is based on the finding that a high cooling rate can nevertheless be achieved in that the amount of heat introduced into the material by means of high-energy, focused radiation is only selectively locally introduced in a reduced, small melt volume, the melting capillary forming a melt channel, which can rapidly be cooled. The fast solidification of the molten material in the melting channel is carried out by extracting heat from the melting capillary via the cold un-melted material volume adjoining the melting capillary (self-quenching), which volume dissipates its heat to one or more heat sinks that are closely coupled in a head conductive manner, wherein the heat sink is coupled to at least one part of at least one surface of the material volume in a close heat-conductive manner and the heat sink on his part is cooled by a cooling liquid.

Thus, the non-liquefied base metal adjacent to the melting capillary acts as a direct cooling medium for the melting capillary, on which metal the molten material crystallizes/hardens in an epitaxial manner on the base structure due to the equality in material. Here, the heat is almost abruptly withdrawn from the very small volume of the melting capillary by the environment. The base metal conducts the heat content of the melt in the melting capillary without transition losses to a cooled heat sink, which is cooled by means of a cooling liquid.

Since remelting is preferably performed in vacuum, use of a direct gas or water cooling system being the sole heat sink is usually no option. Gas cooling is usually not suitable for discharging a high heat amount, and the heat capacity of gases and liquids is usually not that high that they can be coupled directly to the processed material in a heat-conductive manner as a heat sink in order to cool said material. In special embodiments, particularly where a very rapid cooling is not required, it can also be provided that a gas or in particular a liquid cooling is sufficient to be the sole heat sink. However, in preferred embodiments a heat sink is used which has a massive, highly heat-conductive material that rapidly and effectively discharges heat from the processed material and is on his part cooled by a cooling liquid. By means of a heat sink made of a highly heat-conductive material, a local overheating of the cooling liquid due to formation of vapor bubbles ("Leidenfrost-Effekt") is prevented. Particularly suitable, high heat-conductive materials are copper or silver.

The heat sink contacts the material to be remelted as close as possible to the melting capillary with a most great surface area and free of gaps. Depending on the respective shape of the material to be processed, the heat sink may be formed as a separate, external holding means, e.g., as a pressure, clamping, compression or tensioning device (e.g. pressure jaws, holding plates, tensioning device, collet, clamping chuck) contacting the surface of the processed material from the outside, or be a heat sink integrally formed to the material, for example, a cooling jacket made of a (shrunk, crimped or overmolded) tube, in particular copper tube, or a cooling core having a (shrunk or expanded) core or tube, in particular copper core or copper pipe. The different variants can also be combined with one another to achieve a very high cooling rate.

The heat sink per se is cooled by means of a cooling liquid, for example by means of water, deep-cooled alcohol or liquid nitrogen, in particular via an external cooling circuit. The cooling fluid can flow around the heat sink. Preferably, the heat sink is flown through by the cooling liquid, to which end cooling channels or cooling cavities are formed in the heat sink for feeding the cooling liquid through the heat sink.

For remelting the entire material volume, a very large part of the material volume or a desired portion of the material volume of the material, the focus of the focused radiation is moved over the material or the melting capillary is moved through the material. Here, the focus of the high-energy, focused radiation and the radiated material are moved relative to one another such that the desired area is swept over by said focus. The movement may be effected by moving the focus relative to a stationary radiated material, by moving the radiated material relative to a stationary focus, or by moving both the focus and the radiated material and may be linear, zigzag, spiral, circular, or of any other shape.

In order to achieve a high cooling rate, the heat sink is coupled at a point of the material volume to the material volume in a well heat-conductive manner, which point is close to the focus of the focused radiation on the material or close to the melting capillary in the material. Here, the term "close" means "next to", "close with", "directly adjacent" or "directly neighboring". The length of the path that the heat has to take from the melting capillary via the processed material to the heat sink should be as short as possible in order to achieve efficient cooling of the melting capillary by means of the heat sink through the material surrounding it. In advantageous embodiments, the distance of the focus of the focused radiation on the material to the heat sink or the distance of the melting capillary in the material to the heat sink is less than 50 times, preferably less than 25 times and particularly preferably less than the tenfold of the diameter of melting capillary. Here, the term distance refers to the non-remelted or un-melted remaining wall cross-section in the material. If a maximum cooling rate is desired, the focus of the radiation or the melting capillary, respectively, can be advanced to the heat sink leaving a remaining distance which corresponds to twice the diameter of the melting capillary.

When remelting pipes with internal cooling, the heat sink is located directly underneath the melting capillary and thus directly withdraws energy from the upstream and downstream material volume. Thus, a leading and a lagging heat flow is discharged, a closer placement is not possible. In the case of wall thicknesses greater than 2 mm or solid bars or blocks, an additional acceleration of the heat discharge can be achieved by means of an additional external cooling, which can be further enhanced by an inclined radiation of the focused radiation.

The lower the thermal conductivity of the material, the more it is required to place the heat sink close to the melting capillary. Due to the fact that the thermal conductivity of Nitinol is very low, this characteristic is particularly important for this material. By combining the cooling of the melting capillary via the surrounding base metal with the intense cooling by a closely coupled heat sink, that discharges its heat to an external cooling circuit, a very high cooling rate can be achieved so that a very rapid solidification is enforced.

Due to the high temperature in the vapor capillary, all precipitations/secondary phases are completely dissolved in the shortest possible time. Here, the molten metal flows around the vapor capillary and solidifies on the rear side thereof, i.e. "downstream" relative to the direction of movement of the focus on the material. The distinct movement of the material of the melting capillary, i.e. the material being flown around in a so-called Marangoni convection, leads to an intensive and homogeneous mixing of the material in the melting capillary. During the ongoing remelting, the heat transfer is effected in three spatial directions. Here, the epitaxial solidification to the lattice of the base metal effects a very high heat dissipation.

By rapid cooling of the small-volume melting capillary, the formation of precipitations can be completely suppressed. Thus, by means of a local, focused, moving melting capillary a massive semi-finished product can be formed by rapid cooling, the solidification structure of said product not having any precipitations or inclusions. Thus, the method according to the invention could be described as "Focused Quench Casting".

The process parameters are specifically chosen depending on the material such that the melting point of the phases to be dissolved is reached. The small melt volume present in the narrow melt channel solidifies with a high solidification rate by means of heat discharge into the cooled environment. The solidification rate is adjustable by means of the feed rate, i.e. the speed at which the melting capillary moves through the material. Via the control of the solidification rate the type, the volume proportion and the size of the precipitations can be influenced and adjusted.

This finding according to the invention can not only advantageously be used in Nitinol, but also in other materials, in order to obtain a homogeneous structure or an extremely fine distribution of precipitated phases, respectively, or to produce or process semi-finished products.

In preferred embodiments, an electron beam, laser beam, ion beam or plasma beam is used as high-energy, focused radiation. By means of these embodiments, both a high energy and a high energy density in the focus of the radiation on the material can be achieved. In this regard, an electron beam is preferred. The high-energy, focused radiation can be a continuous beam or an intermittent, pulsed beam.

The electron beam surface layer treatment is known from the prior art. See, for example, US 2005/0263219 A1. It is used for treating the surface layers of metallic materials with an electron beam in order to protect them against wear and corrosion. A distinction is made between solid-phase processes (hardening, annealing, tempering) and liquid phase processes (remelting, alloying, dispersing, applying). In contrast to the invention, heat dissipation by means of a heat sink cooled by a cooling liquid is not effected, and no semi-finished or intermediate product is processed, but a final product. Further, only the surface is treated in the electron beam surface-layer treatment, whereas in the invention the structure of a solid material is remelted in a large depth and thus 100% or nearly 100% of its cross section and/or its volume. A variant hereof is plasma boundary layer treatment, see US 2008/0000881 A1, for example.

In analogy to the known deep penetration welding, the invention could be referred to as deep beam remelting or deep beam re-alloying because it generates a melting capillary for all used high-energy, focused radiations, i.e. generates a melting capillary also for a preferred electron beam, as it is known as a vapor capillary from the deep penetration welding with a laser beam. Laser beam welding is divided into heat conduction welding, in which the material only melts at the surface, and the laser deep penetration welding or deep penetration welding, which is based on the generation of a vapor capillary (also called keyhole) in the material. Here, the low thermal stress of the workpiece is important to allow a deformation-resistant and distortion-free processing. In the case of high beam intensities in the focus, a vapor capillary develops in the melt in the beam direction, a tubular hollow space filled with metal vapor or partially ionized metal vapor, which is also called keyhole. The material is thus also melted in the deep, and the depth of the melting zone may be a multiple of its width. Due to multi-reflections on the walls, the vapor capillary increases the absorption of the laser beam in the material, which is why an enlarged melt volume may be generated compared to heat conduction welding.

Provided that there is a sufficient intensity, the melting temperature is reached and local evaporation starts. If the supplied power is further increased, a steam channel finally forms, the geometry of which is influenced by the beam and process parameters. The development of the vapor capillary, also called keyhole, is characteristic for deep penetration welding. The pressure of the vaporizing material counteracts the hydrostatic pressure of the surrounding melt and its surface tension and prevents the closing of the capillary. By the relative movement between laser beam and work piece, new material is constantly melted, which laterally flows around the vapor capillary and solidifies again behind it due to energy transport through conduction and convection.

In the invention, melting takes place with such a high energy density that a melt channel is formed in analogy to the deep-weld effect, which is continuously passed through the volume of the material to be remelted. The narrow melt film flowing around the steam channel comes back together behind the advancing steam channel and solidifies as a result of heat dissipation. Here, solidification is effected faster the narrower the melt channel is formed and the higher runs the feed motion.

A semi-finished product produced according to the invention can be used in its present form or further processed into a final product in conventional forming processes. For example, the solidification casting structure obtained by remelting or re-alloying according to the invention can be homogenized in a subsequent heat treatment process, followed by a further heat or cold forming process, before it is further processed in an existing control process. A generated material can for example be pressed by means of an extrusion process to a wire or be processed by means of forging or other chip-less forming processes such as rolling and drawing. Non-remelted regions of the material, e.g. a peripheral shell adjacent to a cooling surface or a non-remelted core of the material, or a heat sink formed on the material, for example a copper jacket or copper core, can be removed before, during or after the final reforming process of the massive semi-finished product by mechanical or chemical processes, for example by overmilling, overgrinding or by outdrilling in analogy to the pipe production.

The following table shows the advantages in the inclusion size of Nitinol produced according to the invention. Shown is the result of metallographic investigations on Nitinol semi-finished products that were produced according to the prior art (VAR) and by the method according to the invention by electron-beam remelting with active quenching. The examination method has been optimized in order to make the small size of inclusions of the $Ti_2NiO_x$ type discernable.

|  | VAR | Invention |
|---|---|---|
| Area proportion of inclusions | 0.73% | 0.15% |
| Average size of inclusions | 2.80 μm | 0.40 μm |
| Maximum size of inclusions | 16.5 μm | 1.54 μm |

It can be seen that the invention achieves significant advantages, since the area of the inclusions, the average size of the inclusions and the maximum size of inclusions are significantly reduced. The table shows results of simple embodiments of the invention. It has been found that the inclusions can be avoided completely or almost completely by improved process control, in particular by means of a higher cooling rate. By means of the invention a material can be produced that contains no, virtually no or very few inclusions and has a homogeneous distribution of inclusions, which are much smaller than in the prior art. By finishing (also called refining) Nitinol by selective remelting by means of high-energy radiation and rapid solidification according to the inventive method, extraneous phases and inclusions can completely be prevented or dissolved or can be dispersed finely distributed in a non-disturbing, uniform manner within the structure. Further, by means of the invention, compact, massive semi-finished products having a large volume can be remelted or re-alloyed or produced, nevertheless achieving a high cooling rate. The invention thus offers significant advantages compared to the prior art.

With respect to the advantages of the invention, in particular in the case of Nitinol, it is pointed out that he bending fatigue strength of a material is determined by:
  (i) the load level (elongation/shear),
  (ii) structural defects (structural inhomogeneities/inclusions, voids)
  (iii) and possibly superposed corrosion fatigue.

In the case of a bending load, the tension maximum (due to the greatest elongation in the edge fiber) is always at the surface. Consequently, the material fatigue starts in near-edge areas. As a result of a remelting process with rapid solidification of Nitinol according to the invention, existing secondary phases are dissolved. Hereby, the matrix composition will get richer in titanium, resulting in an increased transformation temperature. In Nitinol, there is a strong temperature dependency of the "plateau tension" (the tension raises by 7 N/mm² per 1° C.) By raising the transformation temperature in a peripheral zone near the surface, a reduction in the outer fiber tension is thus achieved. The structural inhomogeneities are completely dissolved by the remelting and the rapid solidification according to the invention. Also, present voids are closed. The shallow or exposed inclusions and voids present in the previously-used material according to the prior art facilitate corrosion fatigue through the electrolytes in the body fluids; in the invention, the inclusions are prevented and therefore the corrosion resistance is increased.

By reducing, dissolving or preventing the inclusions according to the invention, the deficiencies mentioned above are avoided, particularly in Nitinol. This leads to a higher fatigue strength, improved fatigue behavior and a higher corrosion resistance and biocompatibility. For this reason, advantageous semi-finished products made of Nitinol, e.g. for implants such as woven stents or flexible guide wires may be produced by means of the invention.

However, the invention can advantageously be used not only in the production of Nitinol, but can in general be used for remelting and/or remelt-alloying metallic materials in order to freeze the mutual solubility present in the molten, liquid state or at a higher temperature, respectively, by a very rapid solidification process. This way, the metallurgically fused production of materials is possible with a big massive volume, which so far could only be made in a complex way by means of powder metallurgy methods.

Other examples of alloys that—by means of the method according to the invention—can achieve a significant structural improvement or the production of which thus becomes possible at all, are as follows.

Materials that are difficult to mix can be produced, for example in which difficulties such as no solubility or a density segregation have to be overcome. One example is high-strength copper alloys as CuNb having very good electrical conductivity and high strength. Examples of possible fields of application are high-field magnets, windings for electric motors, pulsed magnets with high flux density and thus high mechanical stress or high-frequency spindles with high centrifugal forces. Due to the very high melting temperature and the extremely low mutual solubility, the material cannot be produced by means of conventional melting methods. One possible solution according to the prior art production includes elaborate powder metallurgical processes via mechanical alloying in ball mills and subsequent compression by means of extrusion. By means of the invention, a melt-metallurgic production is possible. The high temperature in the vapor capillary and the Marangoni convection result in a homogeneous mixing, while the rapid quenching speed leads to a supersaturated solution and finest Niob precipitations.

The high-temperature shape memory alloy TiTa has high demands on melting technology due to the high melting point of tantalum. Due to the insufficient cooling rates in conventional electric arc welding, severe inhomogeneities occur due to segregation. It is possible to achieve a good homogeneity by remelting or alloying by means of the invention.

Other fields of application of the invention are the dissolution of inclusions, for example in cobalt alloys, the dissolution of precipitations, e.g. in magnesium alloys, the dissolution of inclusions in tungsten carbide and in cobalt-based alloys, the alloying of materials difficult to mix and the crucible-free alloying of high-melting reactive metals.

Since all of the alloys taken into consideration normally are highly reactive, the remelting process is preferably performed by applying an inert gas, such as a noble gas, or preferably in a vacuum. Remelting in a vacuum provides the further advantage that an additional cleansing is effected due to out-gassing and evaporation of low-boiling impurities.

Typical or preferred parameters of a method and a corresponding apparatus according to the invention are the following. The diameter of the radiation focus on the material and the diameter of the melting capillary in the material is 0.1 mm to 10 mm, preferably 0.1 mm to 4 mm, and particularly preferred 0.2 mm to 2 mm. The depth of the melting capillary in the material is 1 mm to 400 mm. The energy per unit length can typically be in the range of 5-1000 J/mm, depending on the displacement velocity, the remelting depth and the material. The intensity of the radiation can for example be 0.1 kW/mm² to 25 kW/mm² or more, also depending on the displacement velocity, the remelting depth and the material. The displacement velocity ranges between 2 mm/sec to 500 mm/sec. The cooling rate of the processed material can be controlled via the parameters of the radiation, the displacement velocity and the heat dissipation or cooling. As a result, the cooling rate ranges between $10^2$-$10^5$ K/sec, preferably more than $10^3$ K/sec. The remelting speed or solidification rate of the processed material, i.e. the feed rate at which it can be pushed out in a continuous process of a cooled clamping device, may—depending on the thermal conductivity and solidification rate of the material to be remelted—range from 1 mm/sec to 10 m/sec. The outer diameter of machined rods and pipes can range from 1 mm to 200 mm or more, wherein in thick bars, a non-remelted core possibly remains. The wall thickness of tubes can range from 0.2 mm to 100 mm or more, preferably more than 1 mm. Bolts that are processed on its face side can be high up to 400 mm, with a diameter from 2 mm to 250 mm, preferably more than 10 mm and particularly preferably more than 20 mm. The thickness of machined plates and strips is almost arbitrary, typically 1 mm to 5 mm or up to 20 mm, and its width measured transverse thereto or in beam direction is 1 mm to 400 mm, or possibly more.

In a typical exemplary application, Nitinol was remelted with an electron beam having an energy of 5 kW with a focus size of 1 mm², a melting capillary depth of 3 mm and a displacement velocity of 50 mm/sec.

The invention is explained in more detail below by means of exemplary embodiments illustrated in the figures. The specific features described herein can be used individually or in combination to create preferred embodiments of the invention. Identical or identically acting parts are designated in the various figures with the same reference numerals and are usually described only once, even if they can be advantageously used in other embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
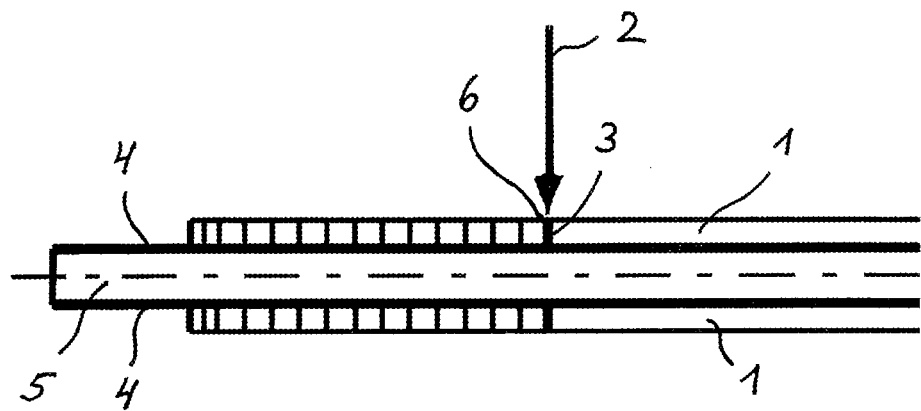
FIG. 1 illustrates a method according to the invention in the case of a pipe with internal cooling and vertical beam.

FIG. 1 illustrates a method according to the invention for producing metallic semi-finished products by remelting a metallic material 1 in the form of a pipe. The material is melted selectively locally in a melting capillary 3 in the material volume by means of high-energy, focused radiation 2, wherein the withdrawal of heat from the melting capillary 3 is performed by the non-remelted, cold material volume adjacent to the melting capillary 3. Simultaneously, with the melting of the material 1 by means of the focused radiation 2 the material volume is cooled by means of a heat sink 4 in order to dissipate the heat transferred from the melting capillary 3 to the material volume, wherein the heat sink 4 is coupled to at least one part of a surface of the material volume in a well heat-conductive manner and the heat sink 4 is cooled by means of a cooling liquid 5.

FIG. 1 shows an example in which a tube-shaped material is 1 processed as initial semi-finished product, wherein a pipe made of a highly heat-conductive material is used as a heat sink 4 for the pipe-shaped material 1, which pipe is flown-through by a cooling liquid 5. The heat sink 4 is realized as a pipe pressed on the material 1 from the inner side.

In the example of FIG. 1, the heat sink 4 is an inner pipe made of a material with good thermal conductivity, which is introduced into the material 1 and which is flown-through by a cooling liquid. The gap-free contacting of the inner pipe with the material 1 can for example be achieved by expanding the inner pipe, wherein the shrinkage stresses occurring when remelting the material 1 additionally support the contact with the heat sink 4. The inner tube cooled by means of a liquid 5 fed therethrough on the one hand provides direct heat dissipation and on the other hand prevents a sagging of the melt when processing. The heat sink 4 is thus coupled in a well heat-conductive manner at a point of the material volume to the material volume, which point is close to the focus 6 of the focused radiation on the material 2 or to the melting capillary in the material.

In rotationally symmetric initial semi-finished products (bolt, rod, wire), the heat sink is e.g. formed by a clamping tongs. In rotation-shaped hollow bodies, heat dissipation can be achieved by means of an external as well as an internal heat sink. The internal heat sink may be formed of a solid material, wherein the heat is dissipated via a cooled clamping chuck. The heat sink can as well be directly flown-through by a cooling liquid. The heat introduced into the heat sink heat is dissipated via an external cooling circuit.

In short pipe-shaped materials, a cooling rod, e.g. copper rod, may be introduced into the core hole of the material as heat sink instead of the cooled inner pipe, wherein the absorbed heat is discharged into a cooled clamping device via the clamping of the cooling rod. The heat sink is then formed by the interaction of the cooling rod with the clamping device. For longer tube-shaped materials, preferably a copper pipe which is directly flown-through by the cooling liquid is introduced as a heat sink in the initial pipe.

For melting of the material volume of the material 1 surrounding the melting capillary 3, the focus 6 of the focused radiation 2 is moved over the material 1 or the melting capillary 3 is moved through the material 1, respectively, wherein the focus 6 of the high-energy, focused radiation 2 and the radiated material 1 are moved relative to one another in such a way that the desired area is swept over by the focus 6. The already remelted area of the material 1 is depicted with dashed lines. Here, the material 1 is remelted to a depth that corresponds to the depth expansion of the melting capillary 3. This can be the entire thickness of the material 1, here the wall thickness of the pipe, or a part of the material thickness of the material 1.

Figure 2:
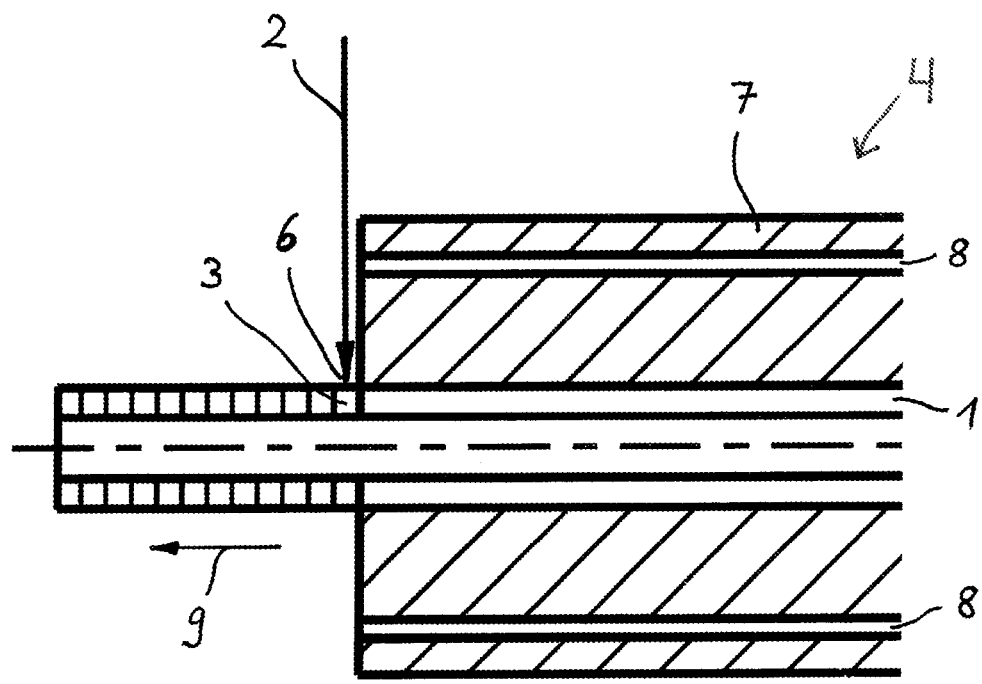
FIG. 2 illustrates a method according to the invention in the case of a pipe with external cooling and vertical beam.

FIG. 2 shows—in a longitudinal cut through a device according to the invention—performing of a modified example of a method according to the invention, in which a rod-, round rod-, wire-, bolt- or tubular-shaped material 1 is processed as an initial semi-finished product, namely a pipe with external cooling. Here, a clamping device 7, e.g. a collet or a clamping chuck made of a highly heat-conductive material, engaging around the initial semi-finished product is used as a heat sink 4, into which the initial semi-finished product is clamped. Accordingly, also a round rod could be clamped in the clamping device 7 and processed over its shell surface by means of the radiation 2. In order to achieve a high cooling performance, the clamping device 7 is configured in a form-fit manner with respect to the initial semi-finished product and is pressed against the initial semi-finished product in a gap-free manner by means of segmentation.

The clamping device 7 is cooled by means of a cooling liquid which flows through the cooling channels 8 mounted in the clamping device. In order to achieve a cooling as good as possible of the melting capillary 3 in the material 1, the focus 6 of the radiation 2 is on the shell surface of initial semi-finished product directly adjacent to the clamping device 7, so that the processing, i.e. the remelting of the material 1, takes place immediately at the transition of the material 1 to the cooled clamping device 7.

Figure 3:
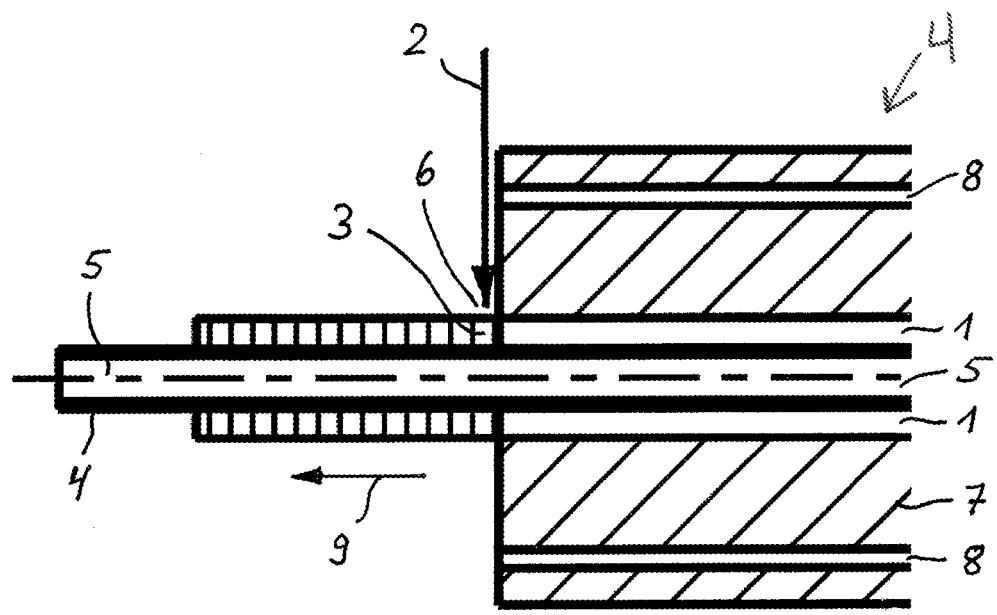
FIG. 3 illustrates a method according to the invention in the case of a pipe with internal and external cooling and vertical beam.

FIG. 3 shows a combination of the embodiments of FIGS. 1 and 2, i.e. a pipe-shaped material 1, which is cooled with both an internal cooling according to FIG. 1 as well as with an external cooling according to FIG. 2, in order to achieve a particularly high cooling rate. The combination of an inner heat sink 4 with an outer heat sink 4 can be advantageous also with particularly large diameters or wall thicknesses of the material 1. When remelting pipe-shaped bodies, heat from the processed material 1 can be discharged additionally to the clamping device by means of an internal heat sink in the form of a tightly fitting inner pipe or inner rod.

In the embodiments of FIGS. 2 and 3, the initial semi-finished product is pulled out or pushed out of the clamping device 7 in the axial direction, i.e. in a feed direction 9 of the initial semi-finished product when being processed by means of the radiation 2. The clamping device 7 is configured accordingly to that end. Further, according to a preferred embodiment, the initial semi-finished product is rotated about its longitudinal axis while being processed with the radiation 2 and the clamping device is configured accordingly to that end, so that the focus 3 of the radiation 2 can move over the shell of the material 1. Thus, the material exits helically from the clamping device 7 and is thereby remelted.

By means of the rotational movement of the initial semi-finished product and its simultaneous axial feed out of the clamping device 7, as in the embodiment according to FIG. 1, the material volume can be remelted by a rotatorily generated spiral path of the focus 6 on the material 1 or by an overlapping successive series of axially running paths. To increase the cooling rate, spiral paths can be lined up in a temporal or locally offset order. A further increase of the cooling rate can be effected by means of a non-overlapping remelting in multiple spirals following one another in a time offset after a certain time of thermal cooling. This can be effected both after completion of the first spiral in a further operation and through beam splitting using multiple melting capillaries 3.

Figure 4:
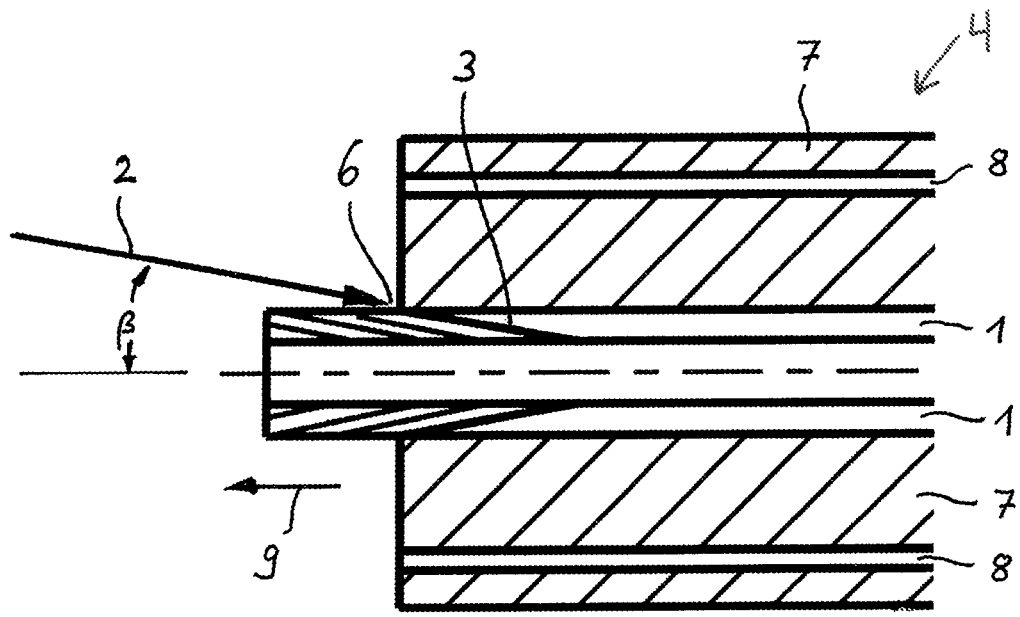
FIG. 4 illustrates a method according to the invention in the case of a pipe with external cooling and inclined beam.

In the embodiments of FIGS. 1 to 3, the irradiation angle β of the radiation 2 on the initial semi-finished product is about 90° relative to the longitudinal axis of the initial semi-finished product. A variation is shown in FIG. 4, which also corresponds to FIG. 2. In FIG. 4, the irradiation angle β of the radiation 2 in the initial semi-finished product is about 10° relative to the axial direction in which the initial semi-finished product projects from the clamping device 7. In general, the irradiation angle β can be between 0° and 90°. The smaller the irradiation angle β, the more it facilitates the achievement of a higher cooling rate in the material 1 by means of the heat sink 4, because the melting capillary 3 formed by the radiation 2 in the material 1 extends until below the clamping device 7 into the clamping device 7 and therefore is closer to the heat sink 4.

Figure 5:
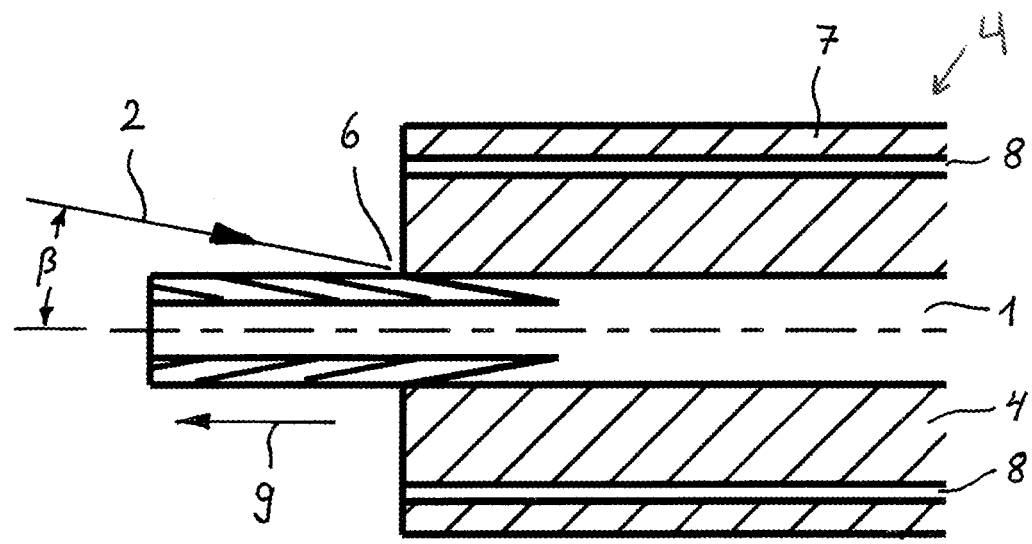
FIG. 5 illustrates a method according to the invention in the case of a bar with external cooling and inclined beam.

FIG. 5 shows an embodiment corresponding to FIG. 4, wherein in modification to FIG. 4, the material 1 processed is not a pipe, but a rod. The rod is pushed out of the clamping device 7 while being rotated about its longitudinal axis. Here, the already remelted portion is depicted by dashed lines. A non-remelted core area remains in the rod, which can be separated at a later time.

Figure 6:
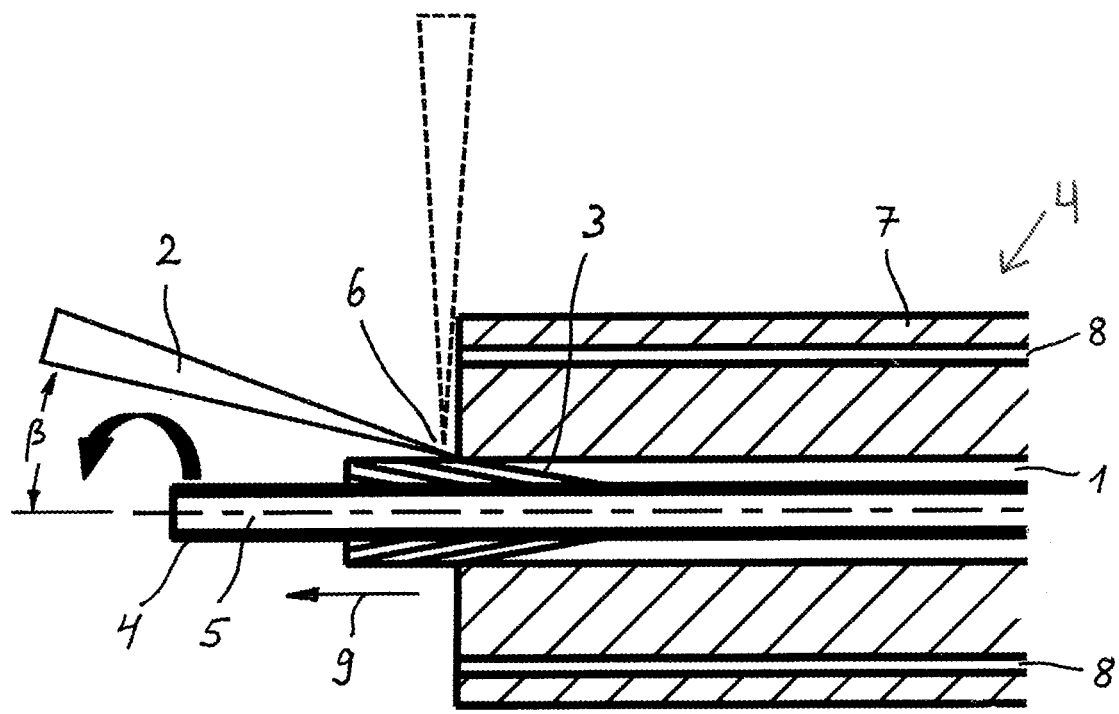
FIG. 6 illustrates a method according to the invention in the case of a pipe with internal and external cooling and inclined beam.

FIG. 6 shows an embodiment corresponding to FIG. 5, wherein in modification to FIG. 5, the processed material 1 is not a rod, but a pipe, comprising an additional internal cooling according to FIG. 3. The pipe is pushed out from the clamping device 7 while being rotated around its longitudinal axis. Here, the already remelted portion is depicted by dashed lines. In FIG. 6, not only the irradiation angle β of 10° is shown, but with dashed lines also an irradiation angle of 90°.

Figure 7:
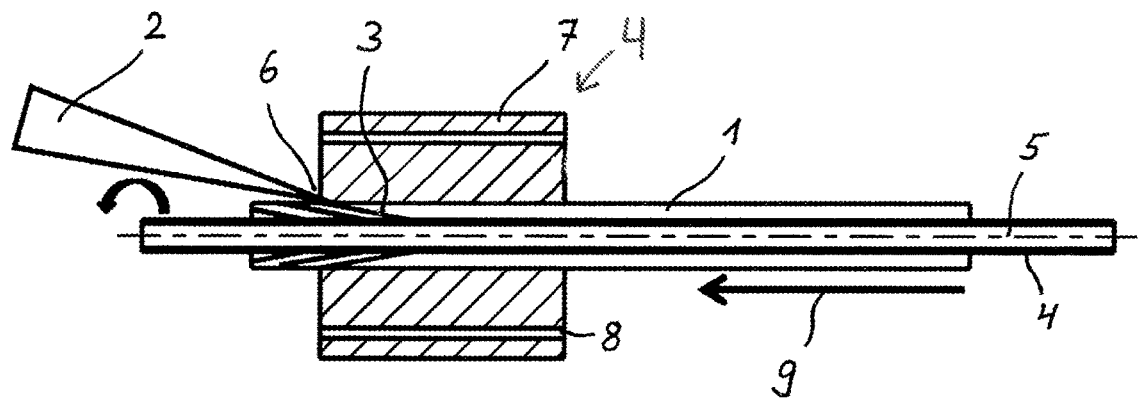
FIG. 7 illustrates FIG. 6 at the start of the processing.
Figure 8:
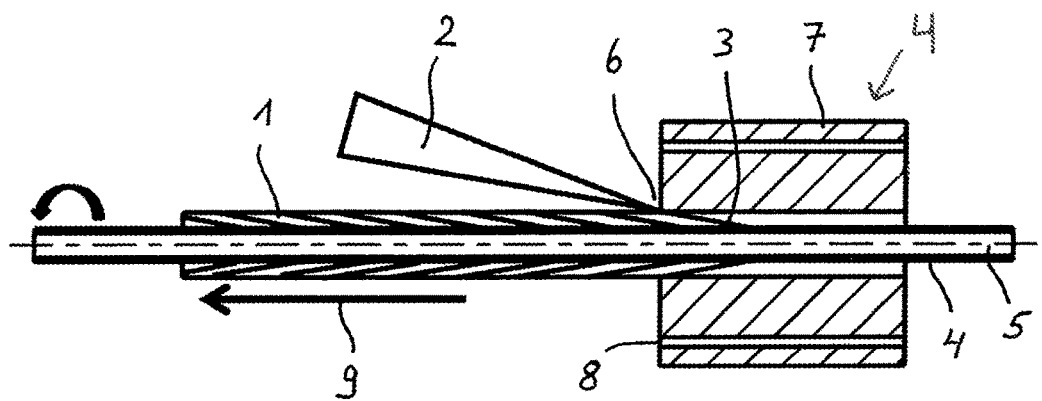
FIG. 8 illustrates FIG. 6 at the end of the processing.

FIG. 7 shows a longer cut with respect to FIG. 6 at the beginning of the processing and FIG. 8 a longer cut with respect to FIG. 6 at the end of the processing of the material 1 with the radiation. Here, it can well be seen how the pipe-shaped material 1 is pushed through the clamping device 7 in a feed direction 9, while performing a rotation and thereby being remelted on its outer shell surface by the radiation 2, wherein the pipe is cooled by the clamping device 7 flown-through by a cooling liquid 5 flowing in the cooling channels 8 and by the inner pipe flown-through by a cooling liquid 5.

Figure 9:
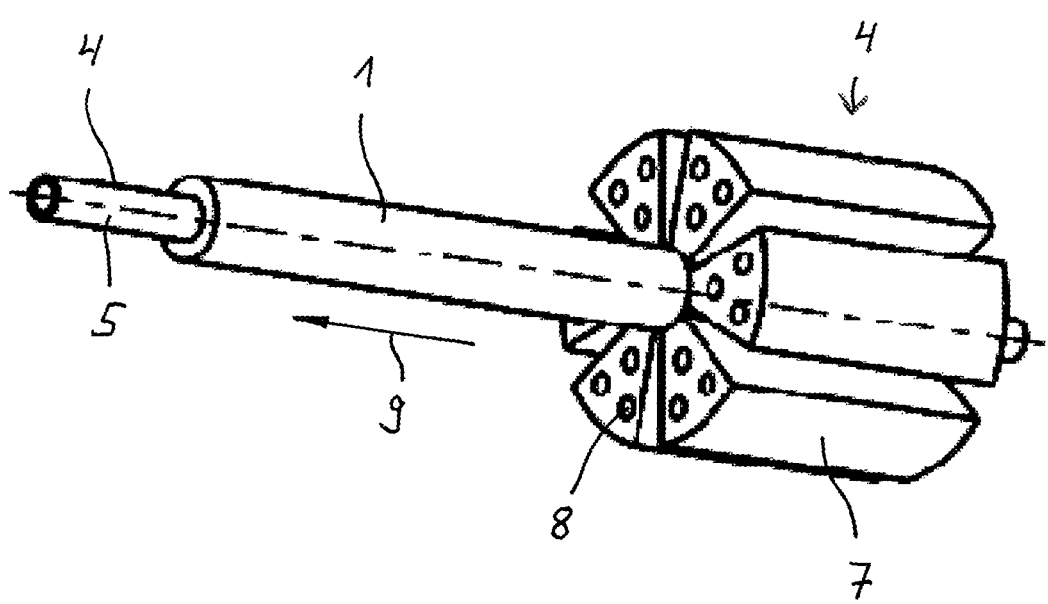
FIG. 9 illustrates a view with regard to FIG. 8.

FIG. 9 shows a perspective view of the clamping device 7 of FIG. 8, in which the cooling channels 8 provided in the clamping device 7 for the cooling liquid 5 and the segmentation of the clamping device 7, which allows a gap-free pressing on the shell of the material 1, can particularly well can be seen.

Figure 10:
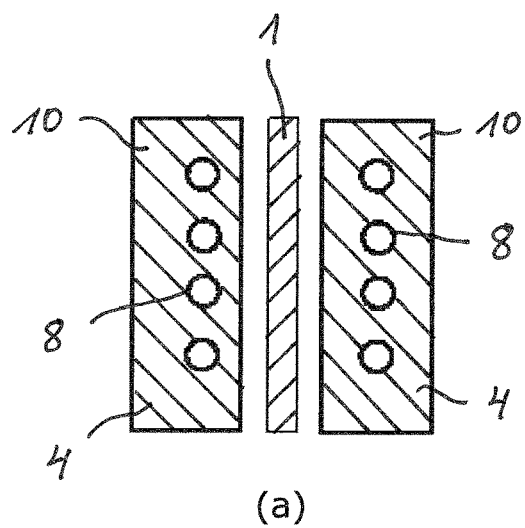
FIG. 10 illustrates a method according to the invention in the case of a plate.
Figure 10:
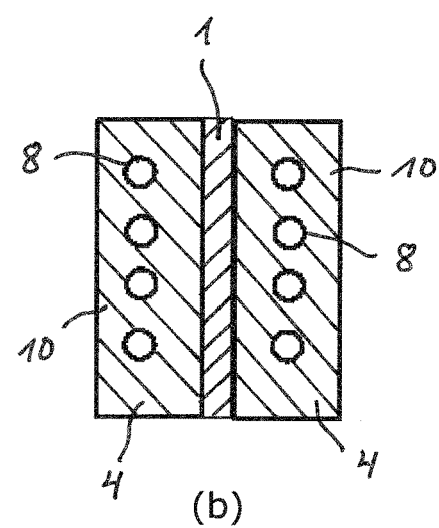
Figure 10:
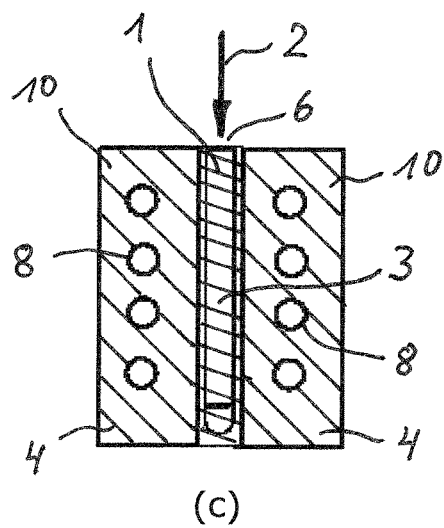
Figure 10:
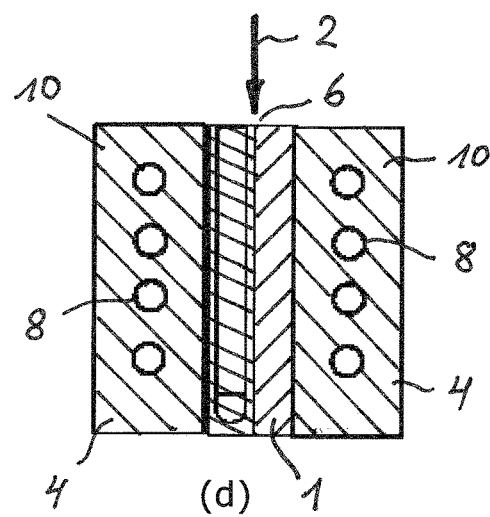
Figure 10:
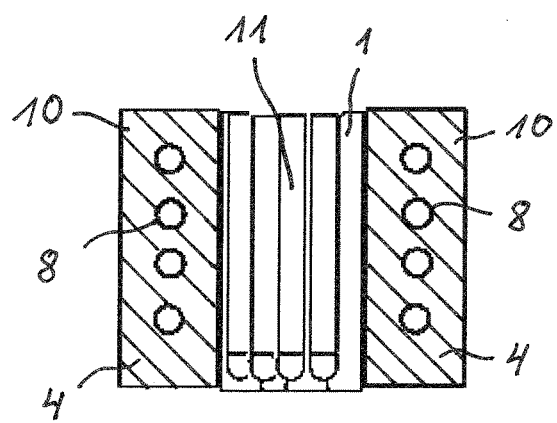
Figure 10:
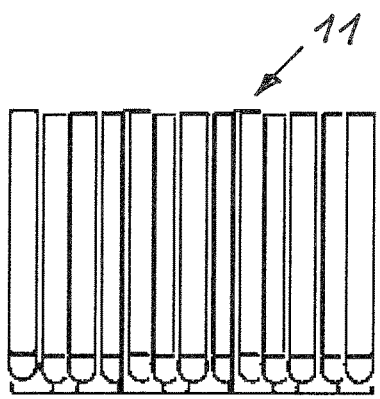

FIG. 10 illustrates a method according to the invention in which a plate- or strip-shaped material 1 is processed as initial semi-finished product, wherein as a heat sink 4 opposing clamping plates 10 made of a highly heat-conductive material of a holding device are used, between which clamping plates 10 the initial semi-finished product is clamped-in or guided through under pressure, and the initial semi-finished product is processed by means of a melting capillary 3 formed between the clamping plates 10, which melting capillary 3 is moved through the initial semi-finished product in the longitudinal direction of the semi-finished product. Additionally, the melting capillary 3 can be moved through the initial semi-finished product transversely to the longitudinal direction of the initial semi-finished product. Preferably, the clamping plates 10 are arranged vertically and the beam 2 comes from above. The depth of the melting capillary 3 preferably corresponds approximately to the height of the clamping plates 10, so that the initial semi-finished product can be processed over its entire cross-section.

FIG. 10 shows in a cross-section through a device according to the invention subsequent process steps (a) to (f). Step (a) shows insertion of the initial semi-finished product to be remelted, for example a plate, a disk or a strip, between two opposing clamping plates 10 provided with cooling channels 8 flown-through by a cooling liquid and step (b) shows the clamping of the initial semi-finished product under pressure between the clamping plates 10. After that, in step (c) the remelting by means of a focused, high-energy radiation 2 acting on the lateral face side of the initial semi-finished product is performed and forms a melting capillary 3 in it. Due to the good cooling as a result of the enclosure of the melting capillary 3 with cooling material, namely the processed material 1 itself, and the good cooling of the material 1 by means of the cooled clamping plates 10 serving as a heat sink 4, the material 1 is cooled abruptly. However, it is also possible not to firmly clamp the semi-finished initial product as a plate between the clamping plates 10, but to feed it as a strip in a continuous operation in a feed direction between the clamping plates 10 adjacent to the strip through the clamping plates 10, which feed direction is preferably transverse to the input direction of the radiation 2, and thereby remelting the semi-finished initial product.

The initial semi-finished product is remelted upright in a trajectory of the focus 6 of the radiation 2 on the initial semi-finished product or, in particular in the case of a larger thickness of the initial semi-finished product remelted in several trajectories of the focus 6 by means of a melting capillary 3. If only one single, straight trajectory of the focus 6 is used, the thickness of the material 1 is only slightly bigger than the diameter of the melting capillary 3. When using successive trajectories of the focus 6, the melting capillary 3 is repeatedly passed through the initial semi-finished product until the desired portion of the initial semi-finished product is processed. The keyhole generated by the radiation 2 penetrates the semi-finished product in the form of a melting capillary 3, which is passed through the semi-finished product in the longitudinal direction, for example. Using the offset trajectory of the focus 6, this process is repeated until almost the entire semi-finished product is remelted. Here, the seam overlapping from one path curve to another may for example be between 10% and 90% of the width of a path, i.e. the diameter of the focus 6 of the radiation 2. If required, a break can be performed between the individual remelting steps for complete heat dissipation into the heat sink 4. The displacement velocity of the focus 6 may be varied for example between 0.1 m/min and 20 m/min, depending on the desired quenching rate. This way, cooling rates higher than $10^4$ K/sec are achieved.

After step (c), the initial semi-finished product may be finished. If the thickness of the processed material 1 is sufficient, further steps (d) through (f) are not required. Instead, in an operation (not shown) following step (c), the remelted massive semi-finished product generated that way may be fly-cut or re-grinded in order to remove the non-remelted portions.

In contrast, if the thickness of the processed material 1 is insufficient in step (c), the steps (d) to (f) may follow, in which steps (a) to (c) can be repeated once or multiple times in order to step by step produce a massive semi-finished product with any desired thickness and a consistently super-cooled structure state. In step (d), the remelted plate obtained from step (c) is clamped between the clamping plates 10 with another, not yet remelted plate laid onto it, which plate is made of a not yet remelted material 1 and remelted by means of the radiation 2. Here, the width of the overlapping of the again remelted region in the already remelted plate from the previous processing can for example be between 10% and 90% of the width of the newly added plate, preferably between ⅓ and ⅔ of the width of the newly added plate. Here, the width of the overlapping and the thickness of the plate in the same direction, namely transversely to the direction of the radiation 2, are considered. That means that a second initial semi-finished product equal in type to the first initial semi-finished product of the same material 1 is clamped between the clamping plates 10 aside to the first, already processed semi-finished product and the thereby formed layer-type initial semi-fished product is processed with a melting capillary 3. Optionally, this process is repeated one or multiple times until a processed material 1 of a desired thickness is achieved. When repeating this process, in each case a recently processed plate is used as a new first plate and another plate is inserted next to it and thus remelted.

Step (d) can be repeated arbitrarily often. In step (e) an intermediate step is shown, in which a fifth plate made of a not-yet remelted material is laid on a block previously formed by four interconnected plates 11 and is remelted with the already remelted block 11 in an overlapping manner. Thus, after a user-defined number of desired repetitions, a block 11 having the desired thickness is obtained, as illustrated in step (f). In this way, by remelting layer by layer, a massive, semi-finished product of any thickness may be built up, which has solidified with high super-cooling. The non-remelted peripheral shell around the body of the semi-finished product can be removed by overmilling overleaf and the thus produced semi-finished product can be used in this form or be further processed to a final product in conventional reforming processes.

Figure 11:
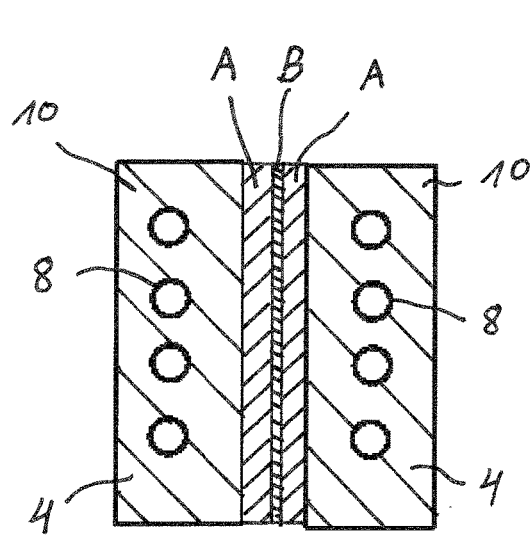
FIG. 11 illustrates a modified method according to the invention in the case of a plate.
Figure 11:
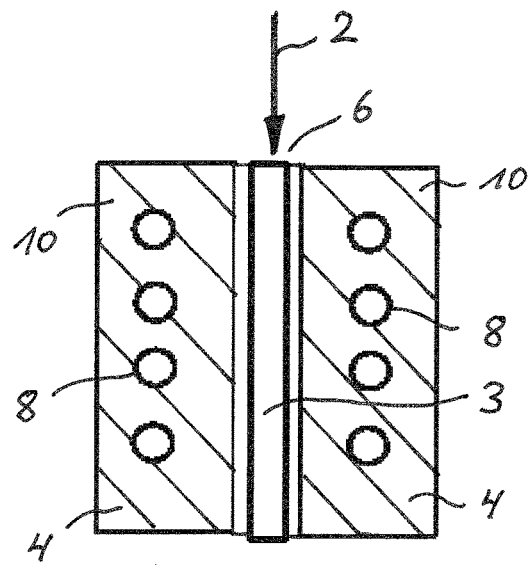
Figure 11:
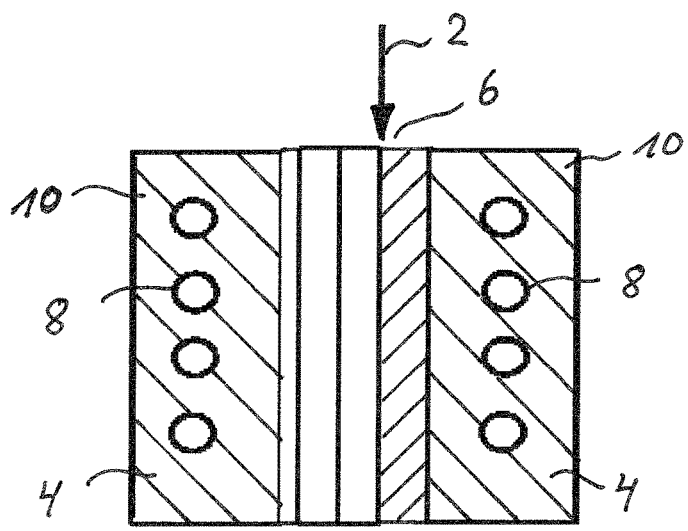
Figure 11:
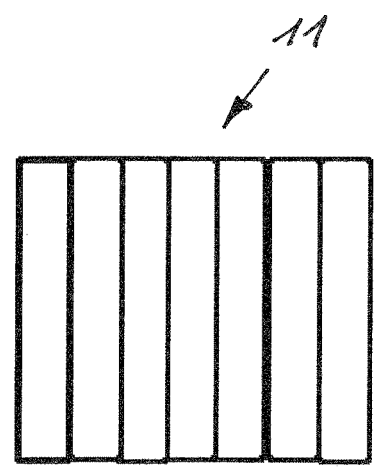

FIG. 11 shows a modification of the method of FIG. 10 in the case of a plate, in which an initial semi-finished product is clamped between the clamping plates 10 and processed, which product has a multi-layer of initial semi-finished products made of different materials. The method according to FIG. 10 can be modified for the production of new alloys in that, besides a structural optimization by means of remelting, a remelt-alloying with further elements is performed at the same time, in connection with a rapid solidification and a high supercooling of the melt.

To that end, a plurality of thin metal sheets made of different pure metals, metal-alloys or material compounds are arranged in a layer manner next to one another and joined together by means of a melting capillary 3, thus being alloyed. In the example of step (a), an intermediate foil made of another base material B is inserted between two plate-shaped base materials A of similar type and commonly remelted in step (b) by means of a melting capillary 3 and thus alloyed into a modified material. A repeated overmelting or an inclined radiation with changing angles can be advantageous for a homogeneous mixing of the components. The method illustrated in FIG. 10 can thus be modified for the production of alloys according to FIG. 11 in that different materials are laid against each other in the initial state. With the use of different initial thicknesses per material, alloys and structure states can be achieved, which cannot be produced in conventional melting processes. This way it is possible to produce metal alloys in form of a solid semi-finished product, which up until now could not be produced.

In FIG. 11, step (c) illustrates how, in analogy to FIG. 10, the process may be repeated until a block 11 of a thick, massive semi-finished product of the alloy is built layer by layer in the desired, user-defined thickness, as illustrated in step (d). The stepwise, layered building-up enables a very high cooling rate even over large component cross-sections.

Figure 12:
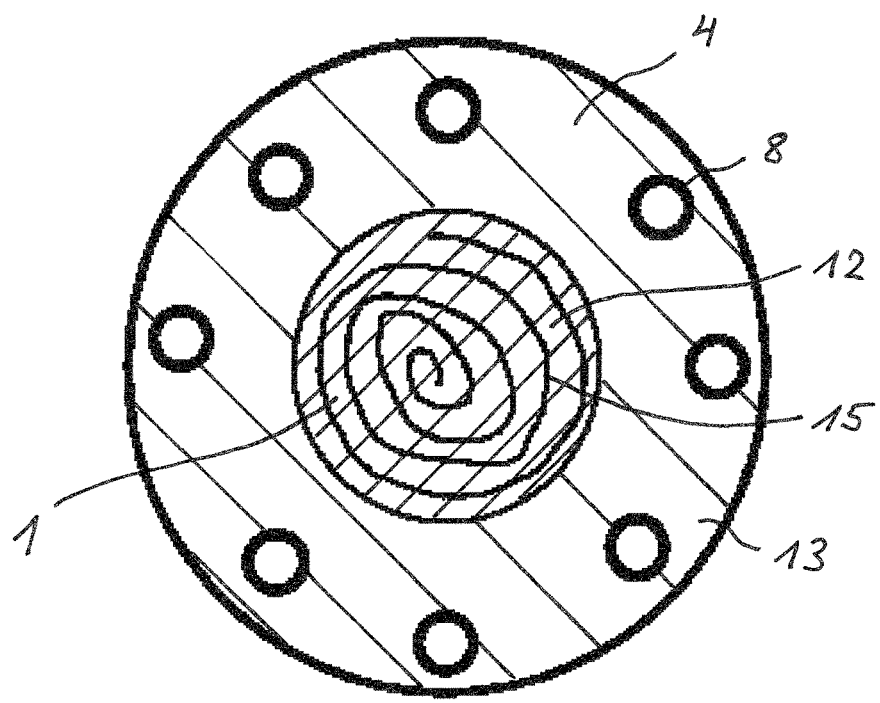
FIG. 12 illustrates a method according to the invention in the case of a bolt with external cooling.
Figure 13:
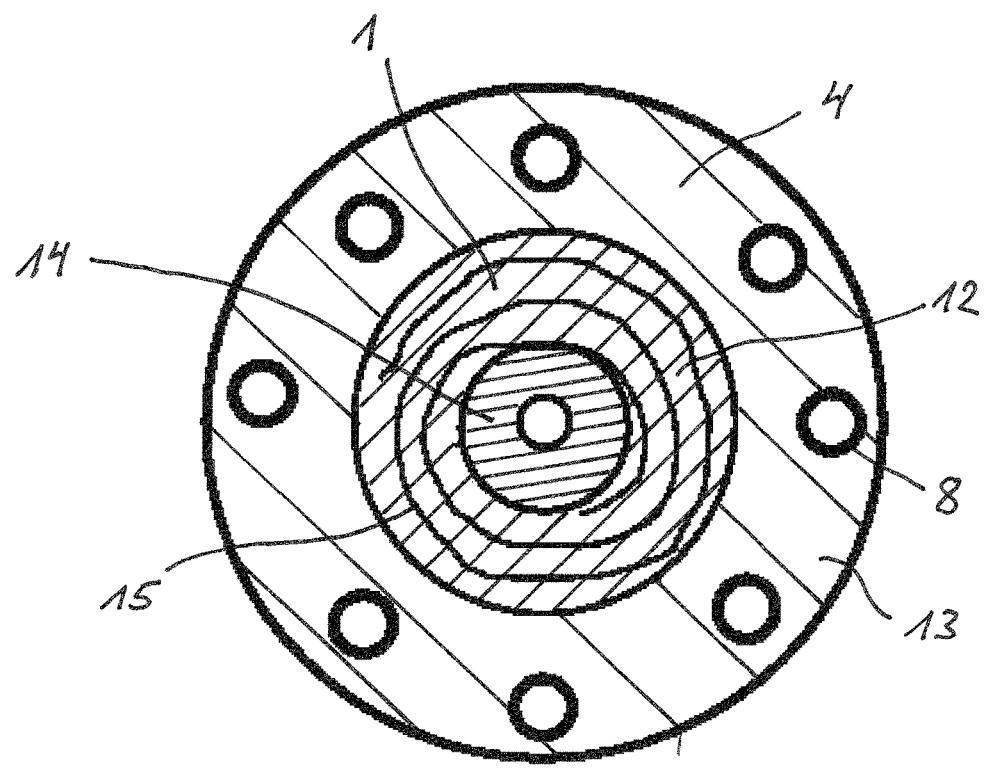
FIG. 13 illustrates a method according to the invention in the case of a bolt with external and internal cooling.

In face-sided top views of corresponding devices according to the invention, FIGS. 12 and 13 illustrate methods according to the invention in which a bolt-shaped material is processed as initial semi-finished product, wherein a cooling jacket 13 made of a highly heat-conductive material enclosing the bolt on its shell surface is used as heat sink 4 and the focus of the radiation is moved over the face side of the initial semi-finished product. FIG. 12 shows the remelting of a bolt 12 by means of a melting capillary and using an external cooling and FIG. 13 shows remelting of a perforated bolt 12 with concurrent external and internal cooling. The height of the bolt can for example be up to 400 mm, the diameter 5 mm to 200 mm. The remelted bolt 12 can be processed by subsequent reforming into a product or a semi-finished product, for example by extrusion, forging and other nun-cutting reforming processes such as rolling and drawing. The remelted bolt 12 can be used as initial semi-finished product for subsequent extrusion forming for production of a wire, for example.

Here, the term bolt 12 or a bolt-shaped material refers to a cylindrical shape of an initial material. As bolt-shaped material can be used an initial material, which is formed of a solid material, of a wound body made of wound strips or foils or of shells of pipe sleeves put together. The bolt-shaped material may configured in full volume (FIG. 12) or have an axial perforation (FIG. 13). If a particularly high cooling rate is to be achieved, a bolt-shaped material can be used, which comprises a cooled mandrel 14 (FIG. 13), i.e. a heat sink 4 in the form of an inner pipe made of highly heat-conductive material, which is cooled by or preferably flown through by a cooling liquid.

To achieve an effective dissipation of the melting heat of the material 1, the bolt-shaped initial semi-finished product is enclosed or surrounded by a cooling jacket 13 of well heat-conductive material, such as copper, which serves as a heat sink 4. In order to achieve good heat dissipation of the material 1 to the cooling jacket 13, the cylindrical bolt 12 is embedded in a cooling jacket 13 made of copper, for example, by pressing the bolt 12 into the cooling jacket 13 or by casting around the bolt with the cooling jacket 13. The cooling jacket 13 can be produced by casting around the material 1 to be remelted, wherein said material fits closely and gap-free on the cooling jacket 13 as a result of the solidification shrinkage. Cooling channels 8 for feeding a cooling liquid therethrough may be provided in the cooling jacket 13. However, the cooling channels 8 can also be achieved in that a pre-formed tubular cooling coil is cast around with the material of the cooling jacket 13.

The radiation direction of the focused radiation is in axial direction of the bolt 12, i.e. right-angled to the face side of the bolt 12. The focus of the radiation is moved in circular or helical trajectories 15 over the face side of the bolt 12, for example, wherein the bolt 12 is remelted by means of the traveling melting capillary formed therein and rapidly cooled by the cooled heat sink. The radiation can act continuously or be interrupted by cooling periods.

The method illustrated in FIGS. 12 and 13 can not only be used for remelting a material 1, but also for forming alloys made of base materials. For this purpose, a bolt 12 is put together by various layered materials, which are remelted in an overlapping manner and are thus alloyed. Such a cylindrical composite bolt 12 may for example be composed of jointed shells of pipes or pipe sleeves of different metals or metal alloys or for a better homogenization by a winding body of layered metal foils and then remelted and alloyed. By winding onto a cooled copper mandrel 14, melt heat can additionally be dissipated to the inside.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing metallic semi-finished products by remelting and/or remelt-alloying of metallic materials, wherein solidification of the melt is effected by a cooling device, the method comprising:
   selectively remelting a portion of a desired area of a material volume of an initial semi-finished product locally in a melting capillary via focused radiation;
   dissipating heat from the melting capillary via a non-remelted portion of the desired area of the material volume that is adjacent to the melting capillary;
   cooling the non-remelted portion of the desired area of the material volume, substantially simultaneously with the remelting of the portion of the desired area of the material volume by the focused radiation, via at least one heat sink in order to further dissipate the heat from the melting capillary to the non-remelted portion of the desired area of the material volume, the heat sink being cooled by a cooling liquid;
   coupling the heat sink to at least one part of at least one surface of the desired area of the material volume in a heat-conductive manner, the at least one part of the at least one surface being located close to a focus of the focused radiation on the desired area of the material volume or close to the melting capillary in the desired area of the material volume, respectively; and
   moving the focus of the focused radiation over the desired area of the material volume or moving the melting capillary through the desired area of the material volume, respectively, for successively remelting an entirety of the desired area of the material volume, wherein the focus of the focused radiation and the material volume are moved relative to one another such that the desired area of the material volume is swept over by the focus,
   wherein the heat sink is a clamping device made of a heat-conductive material and that engages around the initial semi-finished product, the initial semi-finished product being clamped inside of the clamping device.

2. The method according to claim 1, wherein an electron beam, laser beam, ion beam or plasma beam is used as the focused radiation.

3. The method according to claim 1, wherein one of a plate-shaped material, a strip-shaped material, a rod-shaped material, a round rod-shaped material, a wire-shaped material, a bolt-shaped material or a tube-shaped material is remelted or remelt-alloyed as the initial semi-finished product.

4. The method according to claim 1, wherein a material made of Nitinol is remelted or remelt-alloyed.

5. The method according to claim 1, wherein the heat sink is configured as a gas cooling or a liquid cooling heat sink only.

6. The method according to claim 1, wherein the heat sink includes a heat-conductive material of copper or silver.

7. The method according to claim 1, wherein one of a rod-shaped material, a wire-shaped material, a bolt-shaped material or a tube-shaped material is processed as the initial semi-finished product.

8. The method according to claim 1, wherein the initial semi-finished product is pulled out or pushed out of the clamping device in an axial direction while being processed with the focused radiation.

9. The method according to claim 1, wherein the initial semi-finished product is rotated around a longitudinal axis of the initial semi-finished product while being processed with the focused radiation.

10. A method for producing metallic semi-finished products by remelting and/or remelt-alloying of metallic materials, wherein solidification of the melt is effected by a cooling device, the method comprising:
    selectively remelting a portion of a desired area of a material volume of an initial semi-finished product locally in a melting capillary via focused radiation;
    dissipating heat from the melting capillary via a non-remelted portion of the desired area of the material volume that is adjacent to the melting capillary;
    cooling the non-remelted portion of the desired area of the material volume, substantially simultaneously with the remelting of the portion of the desired area of the material volume by the focused radiation, via at least one heat sink in order to further dissipate the heat from the melting capillary to the non-remelted portion of the desired area of the material volume, the heat sink being cooled by a cooling liquid;
    coupling the heat sink to at least one part of at least one surface of the desired area of the material volume in a heat-conductive manner, the at least one part of the at least one surface being located close to a focus of the focused radiation on the desired area of the material volume or close to the melting capillary in the desired area of the material volume, respectively; and
    moving the focus of the focused radiation over the desired area of the material volume or moving the melting capillary through the desired area of the material volume, respectively, for successively remelting an entirety of the desired area of the material volume, wherein the focus of the focused radiation and the material volume are moved relative to one another such that the desired area of the material volume is swept over by the focus, wherein the heat sink includes a heat-conductive material of copper or silver, and wherein the heat sink is formed to the material volume.

11. The method according to claim 10, wherein a cooling jacket made of a pipe or a cooling core made of a core or a pipe is used as the heat sink formed to the material volume.

12. A method for producing metallic semi-finished products by remelting and/or remelt-alloying of metallic materials, wherein solidification of the melt is effected by a cooling device, the method comprising:

selectively remelting a portion of a desired area of a material volume of an initial semi-finished product locally in a melting capillary via focused radiation;

dissipating heat from the melting capillary via a non-remelted portion of the desired area of the material volume that is adjacent to the melting capillary;

cooling the non-remelted portion of the desired area of the material volume, substantially simultaneously with the remelting of the portion of the desired area of the material volume by the focused radiation, via at least one heat sink in order to further dissipate the heat from the melting capillary to the non-remelted portion of the desired area of the material volume, the heat sink being cooled by a cooling liquid;

coupling the heat sink to at least one part of at least one surface of the desired area of the material volume in a heat-conductive manner, the at least one part of the at least one surface being located close to a focus of the focused radiation on the desired area of the material volume or close to the melting capillary in the desired area of the material volume, respectively; and moving the focus of the focused radiation over the desired area of the material volume or moving the melting capillary through the desired area of the material volume, respectively, for successively remelting an entirety of the desired area of the material volume, wherein the focus of the focused radiation and the material volume are moved relative to one another such that the desired area of the material volume is swept over by the focus, wherein a tube-shaped material is processed as the initial semi-finished product, and wherein a pipe formed of a heat-conductive material, which is flown-though by a cooling liquid, is used as the heat sink for the tube-shaped material.

13. A method for producing metallic semi-finished products by remelting and/or remelt-alloying of metallic materials, wherein solidification of the melt is effected by a cooling device, the method comprising:

selectively remelting a portion of a desired area of a material volume of an initial semi-finished product locally in a melting capillary via focused radiation;

dissipating heat from the melting capillary via a non-remelted portion of the desired area of the material volume that is adjacent to the melting capillary;

cooling the non-remelted portion of the desired area of the material volume, substantially simultaneously with the remelting of the portion of the desired area of the material volume by the focused radiation, via at least one heat sink in order to further dissipate the heat from the melting capillary to the non-remelted portion of the desired area of the material volume, the heat sink being cooled by a cooling liquid;

coupling the heat sink to at least one part of at least one surface of the desired area of the material volume in a heat-conductive manner, the at least one part of the at least one surface being located close to a focus of the focused radiation on the desired area of the material volume or close to the melting capillary in the desired area of the material volume, respectively; and moving the focus of the focused radiation over the desired area of the material volume or moving the melting capillary through the desired area of the material volume, respectively, for melting successively remelting an entirety of the desired area of the material volume, wherein the focus of the focused radiation and the material volume are moved relative to one another such that the desired area of the material volume is swept over by the focus, wherein a plate-shaped or a strip-shaped material is processed as the initial semi-finished product, and wherein opposed clamping plates made of a heat-conductive material of a holding device are used as the heat sink, between which clamping plates the initial semi-finished product is clamped-in or guided through under pressure, and the initial semi-finished product is processed by a melting capillary formed between the clamping plates, which melting capillary is moved through the initial semi-finished product in the longitudinal direction of the semi-finished product.

14. The method according to claim 13, wherein, after processing of the initial semi-finished product, a second semi-finished product made of the same material is clamped between the clamping plates next to the already-processed initial semi-finished product and a layer-type initial semi-finished product is formed and processed with a melting capillary.

15. The method according to claim 13, wherein the initial semi-finished product is clamped between the clamping plates and processed, which initial semi-finished product has an arrangement in layers of initial semi-finished products placed adjacent to one another made of different materials.

16. A method for producing metallic semi-finished products by remelting and/or remelt-alloying of metallic materials, wherein solidification of the melt is effected by a cooling device, the method comprising:

selectively remelting a portion of a desired area of a material volume of an initial semi-finished product locally in a melting capillary via focused radiation;

dissipating heat from the melting capillary via a non-remelted portion of the desired area of the material volume that is adjacent to the melting capillary;

cooling the non-remelted portion of the desired area of the material volume, substantially simultaneously with the remelting of the portion of the desired area of the material volume by the focused radiation, via at least one heat sink in order to further dissipate the heat from the melting capillary to the non-remelted portion of the desired area of the material volume, the heat sink being cooled by a cooling liquid;

coupling the heat sink to at least one part of at least one surface of the desired area of the material volume in a heat-conductive manner, the at least one part of the at least one surface being located close to a focus of the focused radiation on the desired area of the material volume or close to the melting capillary in the desired area of the material volume, respectively; and moving the focus of the focused radiation over the desired area of the material volume or moving the melting capillary through the desired area of the material volume, respectively, for successively remelting an entirety of the desired area of the material volume, wherein the focus of the focused radiation and the material volume are moved relative to one another such that the desired area of the material volume is swept over by the focus, wherein a bolt-shaped material is processed as an initial semi-finished product, wherein a cooling jacket made of a heat-conductive material and enclosing the bolt-shaped material on its shell surface is used as the heat sink and the focus of the focused radiation is moved over a face side of the initial semi-finished product.

17. An apparatus for producing metallic semi-finished products by remelting and/or remelt-alloying of metallic materials, wherein solidification of the melt is effected by a cooling device, the apparatus comprising:

a radiation device for generating a focused radiation which is configured to selectively locally remelt a portion of a desired area of a material volume of an initial semi-finished product in a melting capillary, wherein dissipation of heat from the melting capillary is effected via a non-remelted portion of the desired area of the material volume that is adjacent to the melting capillary;

a cooling device for cooling at least one heat sink, which is configured for further dissipating the heat from the melting capillary to the non-remelted portion of the desired area of the material volume by cooling the non-remelted portion of the desired area of the material volume down via the heat sink, while at the same time the portion of the desired area of the material volume is remelted by the focused radiation, wherein the heat sink is adapted to be coupled to at least one part of at least one surface of the desired area of the material volume in a heat-conductive manner and the heat sink is adapted to be cooled by means of a cooling liquid, wherein the at least one part of the at least one surface of the desired area of the material volume is located close to the focus of the focused radiation on the desired area of the material volume or close to the melting capillary in the desired area of the material volume, respectively, wherein, for successively remelting an entirety of the desired area of the material volume, the focus of the focused radiation is movable over the desired area of the material volume or the melting capillary is movable through the desired area of the material volume, respectively, wherein the focus of the focused radiation and the material volume are moveable relative to one another such that the desired area of the material volume is swept over by the focus, and wherein the heat sink is a clamping device made of a heat-conductive material and that engages around the initial semi-finished product, the initial semi-finished product being clamped inside of the clamping device.

* * * * *